(12) United States Patent
Itokawa

(10) Patent No.: US 7,257,265 B2
(45) Date of Patent: Aug. 14, 2007

(54) IMAGE PROCESSING APPARATUS AND METHOD

(75) Inventor: Osamu Itokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 10/649,642

(22) Filed: Aug. 28, 2003

(65) Prior Publication Data

US 2004/0042674 A1    Mar. 4, 2004

(30) Foreign Application Priority Data

Sep. 2, 2002    (JP)    ............................. 2002-256841

(51) Int. Cl.
*G06K 9/36*    (2006.01)
*G06K 9/46*    (2006.01)

(52) U.S. Cl. ...................... 382/243; 382/203; 382/190; 382/236; 382/238

(58) Field of Classification Search ................ 382/128, 382/132, 154, 181, 190, 191, 199, 203, 232, 382/236, 238, 283
See application file for complete search history.

(56) References Cited

U.S. PATENT DOCUMENTS

| | | | | |
|---|---|---|---|---|
| 5,506,621 | A | 4/1996 | Ogasawara et al. | 348/396 |
| 5,604,539 | A | 2/1997 | Ogasawara et al. | 348/396 |
| 5,748,775 | A * | 5/1998 | Tsuchikawa et al. | 382/190 |
| 6,335,985 | B1 * | 1/2002 | Sambonsugi et al. | 382/190 |
| 6,404,901 | B1 * | 6/2002 | Itokawa | 382/103 |
| 6,977,664 | B1 * | 12/2005 | Jinzenji et al. | 345/629 |
| 2001/0004404 | A1 | 6/2001 | Itokawa | 382/239 |
| 2001/0031095 | A1 | 10/2001 | Itokawa | 382/240 |
| 2001/0033620 | A1 | 10/2001 | Itokawa | 375/240.28 |
| 2003/0090751 | A1 | 5/2003 | Itokawa et al. | 358/538 |
| 2004/0131254 | A1* | 7/2004 | Liang et al. | 382/181 |

FOREIGN PATENT DOCUMENTS

JP        7-302328        11/1995

* cited by examiner

*Primary Examiner*—Matthew C. Bella
*Assistant Examiner*—Ali Bayat
(74) *Attorney, Agent, or Firm*—Fitzpatrick, Cella, Harper & Scinto

(57) ABSTRACT

Provided are an image processing apparatus and method whereby even if shape data representing the shape of an object in a moving image undergoes a major change temporarily, a frame that is to be corrected can be detected and corrected in ideal fashion and it is possible to execute moving-image coding that is outstanding both visually and in terms of coding efficiency. In one example, a moving image composed of a plurality of frames is acquired from a image input unit (101) and the background image of the moving image is acquired by a background image generating unit (102). A background subtraction processor (103) extracts an object by comparing each of the frames constituting the moving image with the background image, and an abnormal-data discrimination unit (105) discriminates whether shape data representing the shape of the extracted object is abnormal or not. If the shape data is abnormal, a shape-data correction unit (106) corrects the shape data. An image-data correction unit (107) corrects a frame using the corrected shape data, and the corrected shape data and image data is coded by an encoder (104).

18 Claims, 16 Drawing Sheets

IMAGE PROCESSING APPARATUS AND METHOD

FIELD OF THE INVENTION

This invention relates to an image processing apparatus and method for extracting an object contained in a moving image and detecting an abnormal frame.

BACKGROUND OF THE INVENTION

Processing for separating and combining images on a per-object basis by utilizing digital techniques has become of interest in recent years. In particular, MPEG-4 coding has been standardized as an international standard in the coding of moving images. MPEG-4 coding makes it possible to perform coding/decoding object by object and offers the possibility of various applications that have been difficult to achieve heretofore, examples being an improvement in coding efficiency, data distribution conforming to the transmission path and re-manipulation of images.

A technique referred to as the background subtraction method is known generally as a method of extracting an object in the processing of moving images. This is a method in which points where changes occur are detected by comparing a previously captured background image and an actual input image. The principles of this method will now be described in simple terms.

First, let Pc(x,y) and Pb(x,y) represent a pixel value of an input image and a pixel value of a background image, respectively, at coordinates (x,y) in the plane of an image. The difference between Pc(x,y) and Pb(x,y) is calculated and the absolute value thereof is compared with a certain threshold value Th.

An example of a criterion formula is as follows:

$$|Pc(x,y)-Pb(x,y)| \leq Th \quad (1)$$

If the absolute value of the difference in Equation (1) is equal to or less than the threshold value Th, this indicates that there is no change at the point (x,y) and, hence, it is decided that Pc is background. On the other hand, if the absolute value of the difference in Equation (1) is greater than the threshold value Th, then this indicates that the value has changed and that the point is one that should be extracted. By performing the above discrimination process at all points in an image, extraction of one frame is achieved.

FIG. 13 is a block diagram illustrating the configuration of a conventional system in which the background subtraction method and MPEG-4 coding are combined. An image input unit 1201 in FIG. 13 is for inputting a moving image and is exemplified by the image sensing unit of a camera. Since the background subtraction method requires a background image for reference, the background image is generated by a background image generating unit 1202. Generating the background image by capturing one frame of an image beforehand under conditions in which an object does not yet appear is the simplest method.

A background subtraction processor 1203 generates shape data representing the shape of an object from the input image from the image input unit 1201 and the reference image from the background image generating unit 1202. The image from the image input unit 1201 and the shape data from the background subtraction processor 1203 are input to an encoder 1204 frame by frame and the encoder proceeds to apply coding processing. The encoder 1204 will be described as one which executes coding in accordance with the MPEG-4 coding scheme.

If an object is to be coded, it is necessary to code the object shape and position information. To accomplish this, first a rectangular area that encompasses the object is set and the coordinates of the upper left corner of the rectangle and the size of the rectangular area are coded. The rectangular area is referred to as a "bounding box". The area within an object expressed by an image signal and shape signal is referred to as a "VOP" (Video Object Plane).

FIG. 14 is a block diagram illustrating in detail the structure of the encoder 1204, which executes VOP coding according to the prior art. It should be noted that the inputs to the encoder 1204 are image luminance and color difference signals as well as the shape signal. These signals are processed in macroblock units.

First, in an intra-mode, a DCT unit 1301 applies a discrete cosine transform (DCT) to each block and a quantizer 1302 quantizes the resultant signal. Quantized DCT coefficients and the quantization width are subjected to variable-length coding by a variable-length encoder 1312.

In an inter-mode, on the other hand, a motion detector 1307 detects motion by a motion detection method a primary example of which is block matching with respect to another VOP that is adjacent in terms of time. A motion-vector prediction unit 1308 detects a macroblock that is predicted to exhibit the smallest error relative to a macroblock of interest. A signal indicating motion toward a macroblock that is predicted to exhibit the smallest error is a motion vector. An image to which reference is made in order to generate the predicted macroblock is referred to as a "reference VOP".

A motion compensator 1306 applies motion compensation to the reference VOP based upon the detected motion vector, thereby acquiring the optimum predicted macroblock. Next, the difference between the next macroblock of interest and the corresponding predicted macroblock is obtained, DCT is applied to the resulting difference signal by the DCT unit 1301 and the DCT coefficients are quantized by the quantizer 1302.

The shape data, on the other hand, is coded by a shape coding CAE unit 1309. What actually undergoes CAE coding here are boundary blocks only. With regard to a block inside a VOP (all data within the block lies within the object) and a block outside a VOP (all data within the block lies outside the object), only header information is sent to the variable-length encoder 1312. A boundary block that undergoes CAE coding is processed in a manner similar to that of the image data. Specifically, in the interframe mode, the boundary block undergoes motion detection by the motion detector 1307 and motion-vector prediction is performed by the motion-vector prediction unit 1308. CAE coding is applied to the difference value between the motion-compensated shape data and the shape data of the preceding frame.

However, two problems described below arise with he background subtraction method set forth above.

The first problem involves the fact that this method presumes that there is no change in the background image. Specifically, the problem is that if a value in the background changes owing to a change in illumination or the like, a stable result of extraction will not be obtained. A method of detecting a change in the background image by a statistical technique and updating the background image appropriately has been disclosed in the specification of Japanese Patent Application Laid-Open No. 7-302328 as a solution for dealing with this problem.

The second problem is how to deal with an instance in which a flash is fired in the middle of a scene or in which one object crosses in front of another object. These instances will be described with reference to the drawings. FIG. 15 is a diagram useful in describing shape data representing the shape of an object in a case where a flash is fired in the middle of a scene according to an example of the prior art. Reference numerals 1401 and 1402 denote frame data at a certain time and frame data at the next instant in time, respectively. The scene is illuminated by a flash in the second of these frames. Reference numeral 1403 denotes frame data at the instant in time that follows the frame data 1402. It will be understood that the frame 1402 illuminated by the flash differs greatly from the other results of extraction (1401, 1403).

An instance where there is a change in background illumination, which is the first problem mentioned above, primarily is merely a change in luminance value. In the case of a flash, however, which is the second problem mentioned above, hue also changes. As a consequence, accurate correction of background is difficult to achieve. Further, even if accurate shape data of an object has been obtained, the image data of the object itself also undergoes a major change. With a method such as MPEG-4, therefore, which uses an interframe difference, coding efficiency cannot be raised and the image appears unnatural visually.

FIG. 16 is a diagram useful in describing shape data representing the shape of an-object in a case where one object crosses in front of another object in an example of the prior art. Reference numeral 1501 in FIG. 16 denotes frame data immediately before one object (e.g., a vehicle) crosses in front another object (a person), reference numerals 1502 and 1503 denote frame data when the vehicle is crossing in front of the object that is the person, and reference numeral 1504 denotes frame data immediately after the vehicle has crossed in front of the person. If a second object thus happens to be extracted together with a first object, there is a major increase in amount of information ascribable to a major change in the shape data and image data. This leads to a major decline in image quality. Since this case represents a phenomenon that is entirely different from a change in background illumination, it is difficult to deal with the background image by the updating method.

SUMMARY OF THE INVENTION

The present invention has been proposed in order to solve the problems of the prior art and its object is to provide an image processing apparatus and method whereby even if shape data representing the shape of an object in a moving image undergoes a major change temporarily, a frame that is to be corrected can be detected and corrected in ideal fashion and it is possible to execute moving-image coding that is outstanding both visually and in terms of coding efficiency.

According to the present invention, the foregoing object is attained by providing an image processing apparatus comprising: moving-image input means for inputting a moving image composed of a plurality of frames; background-image acquisition means for acquiring a background image relating to the moving image that has been input; object extraction means for extracting an object by comparing each of the frames constituting the moving image with the background image; abnormal-data discrimination means for discriminating whether shape data representing the shape of the extracted object is abnormal or not; shape-data correction means for correcting the shape data based upon result of discrimination of the shape data; image-data correction means for generating image data, which represents the image of the object, conforming to the shape data that has been corrected by the shape-data correction means; and coding means for coding the shape data and the image data.

The image processing apparatus according to the present invention is such that the abnormal-data discrimination means discriminates the necessity of correcting the shape data by comparing the shape data of the object from frame to frame of a plurality of frames that differ in time.

Further, the image processing apparatus according to the present invention is such that the abnormal-data discrimination means includes: first comparison means for comparing the shape data of the object using a present frame and a preceding frame; second comparison means for comparing the shape data of the object using the preceding frame and a succeeding frame; and decision means for deciding that correction of the present frame is necessary if a difference in the shape data of the object between the present frame and the preceding frame is large and, moreover, a difference in the shape data of the object between the preceding frame and the succeeding frame is small.

Furthermore, the image processing apparatus according to the present invention is such that the abnormal-data discrimination means includes: first comparison means for comparing the shape data of the object using a present frame and a preceding frame; second comparison means for comparing the shape data of the object using the present frame and a succeeding frame; and decision means for deciding that correction of the present frame is necessary if a difference in the shape data of the object between the present frame and the preceding frame is large and, moreover, a difference in the shape data of the object between the present frame and the succeeding frame is large.

Furthermore, the image processing apparatus according to the present invention is such that the abnormal-data discrimination means includes: first comparison means for comparing the shape data of the object using a present frame and a preceding frame; second comparison means for comparing the shape data of the object using frames following the present frame and the preceding frame; and decision means for deciding that correction of prescribed frames from the present frame onward is necessary in a case where a difference between the present frame and the preceding frame is large and, moreover, a difference in the shape data of the object between the preceding frame and the frames following the present frame is small.

Further, the image processing apparatus according to the present invention is such that the first or second comparison means performs the comparison using a comparison of any of the area, perimeter, wavelet identifier, circularity, centroid or moment of the shape data, or a combination thereof.

Further, the image processing apparatus according to the present invention is such that the shape-data correction means corrects the shape data of the object in an Nth frame, which has been determined to be abnormal, using an (N−1)th or earlier frame determined to be normal and an (N+1)th or later frame determined to be normal.

Further, the image processing apparatus according to the present invention is such that the shape-data correction means further includes detection means for detecting corresponding points in the shape data between an (N−1)th or earlier frame and an (N+1)th or later frame.

Further, the image processing apparatus according to the present invention is such that the detection means obtains amount of motion of the corresponding points by performing pattern matching with respect to one or each of a plurality of prescribed areas.

Further, the image processing apparatus according to the present invention is such that the amount of motion of the corresponding points is amount of movement and amount of rotation of the position of the corresponding points obtained by an affine transformation.

Further, the image processing apparatus according to the present invention is such that the shape-data correction means replaces shape data in an Nth frame determined to be abnormal with shape data of an (N−1)th or earlier frame determined to be normal.

Further, the image processing apparatus according to the present invention is such that the image-data correction means generates image data representing the image of the object from a frame different from a present frame in terms of time.

Further, the image processing apparatus according to the present invention is such that the image-data correction means generates an Nth frame determined to be abnormal from an (N−1)th frame determined to be normal and an (N+1)th frame determined to be normal.

Further, the image processing apparatus according to the present invention is such that the image-data correction means replaces an Nth frame determined to be abnormal with an (N−1)th frame determined to be normal.

Further, the image processing apparatus according to the present invention is such that the coding means is coding means compliant with an MPEG-4 visual coding scheme.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Preferred embodiments of the present invention will now be described in detail with reference to the drawings.

Figure 1:
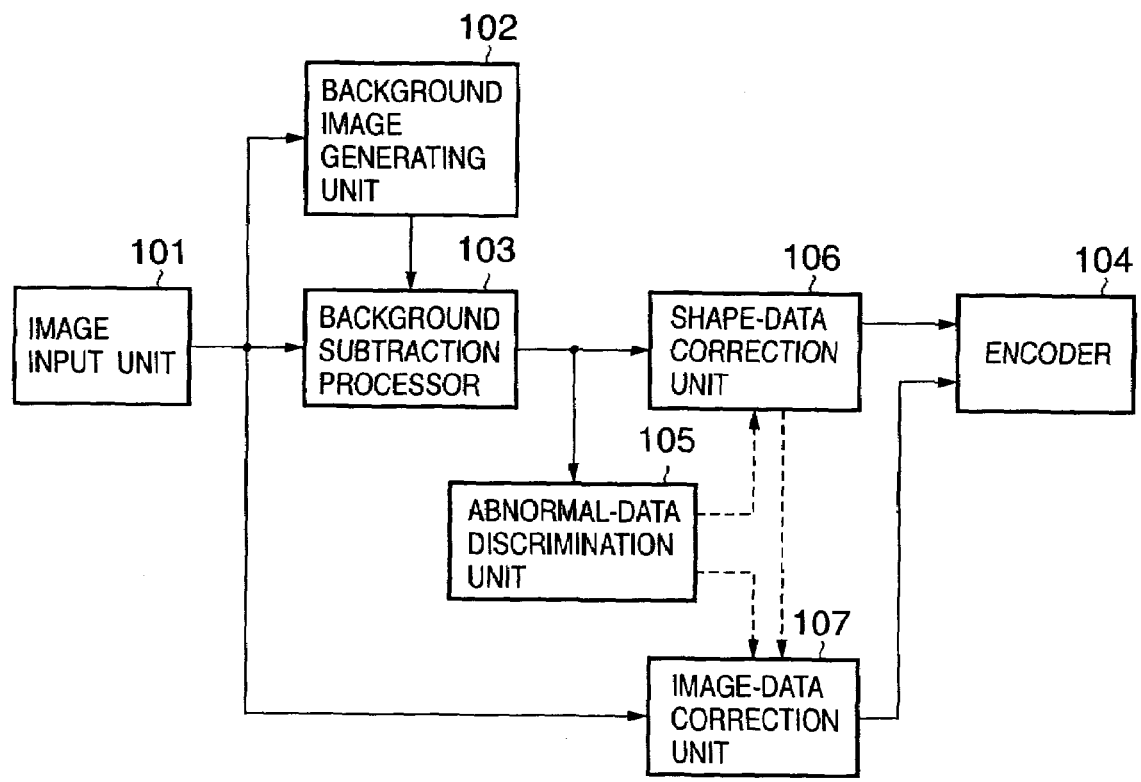
FIG. 1 is a block diagram illustrating the structure of an image processing apparatus according to an embodiment of the present invention.

FIG. 1 is a block diagram illustrating the structure of an image processing apparatus according to a preferred embodiment of the present invention.

Figure 13:
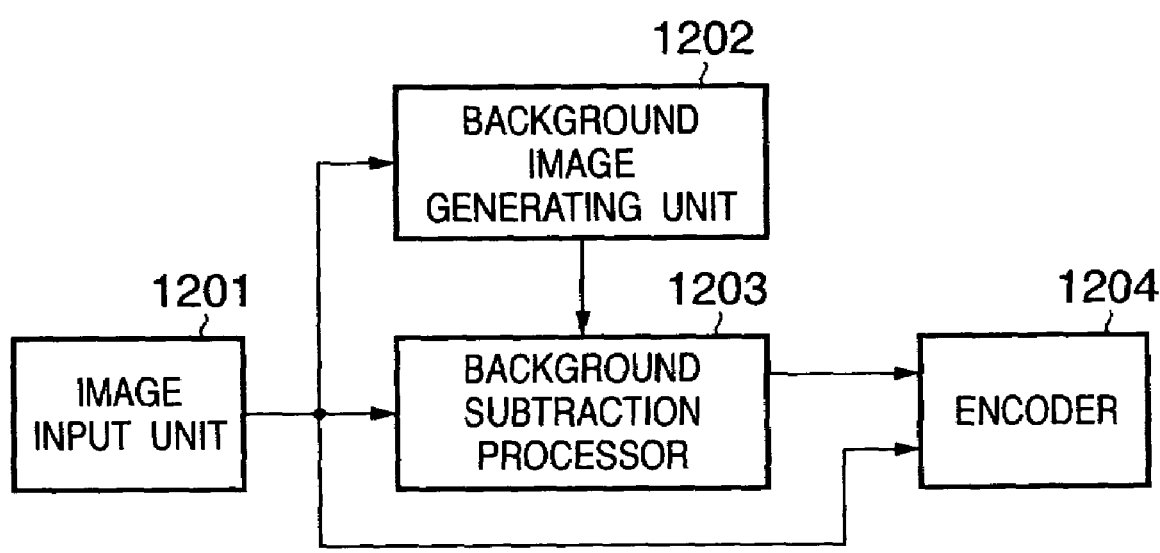
FIG. 13 is a block diagram illustrating the configuration of a conventional system in which the background subtraction method and MPEG-4 coding are combined.
Figure 14:
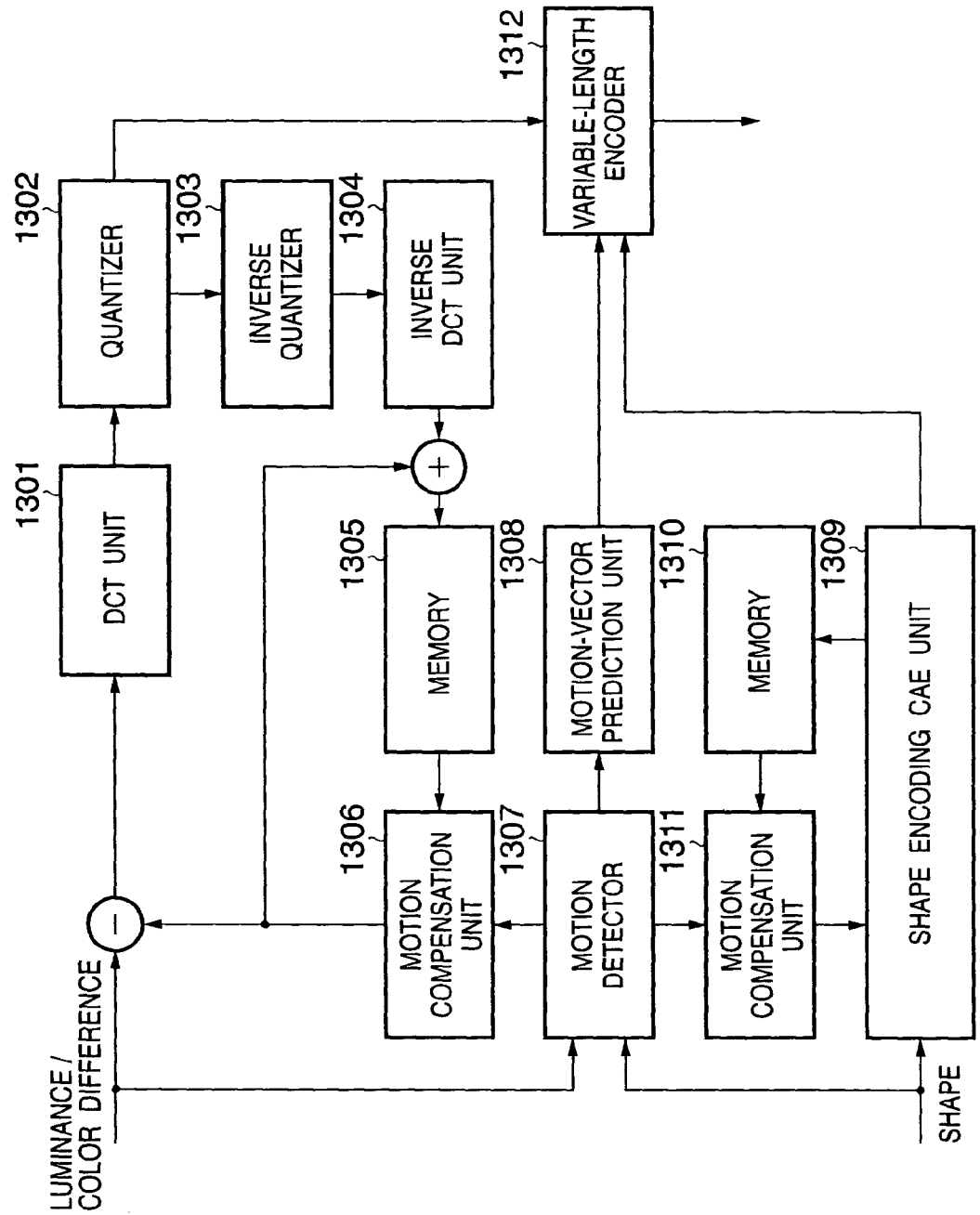
FIG. 14 is a block diagram illustrating in detail the structure of an encoder for performing VOP coding according to the prior art.

In FIG. 1, an image input unit 101, background image generating unit 102, background subtraction processor 103 and encoder 104 have functions identical with those of the image input unit 1201, background image generating unit 1202, background subtraction processor 1203 and encoder 1204, respectively, described above with reference to FIG. 13. Thus, this embodiment is characterized by the fact that the encoder 104 executes coding processing that is compliant with the MPEG-4 visual coding scheme.

The image processing apparatus according to this embodiment further comprises an abnormal-data discrimination unit 105 for detecting an abnormality by examining shape data from the background subtraction processor 103; a shape-data correction unit 106 for correcting the shape data in a case where an abnormality has been detected by the abnormal-data discrimination unit 105; and an image-data correction unit 107 for correcting image data in accordance with the shape data corrected by the shape-data correction unit 106. The altered image data and shape data is input to the encoder 104 and is coded thereby.

Figure 2:
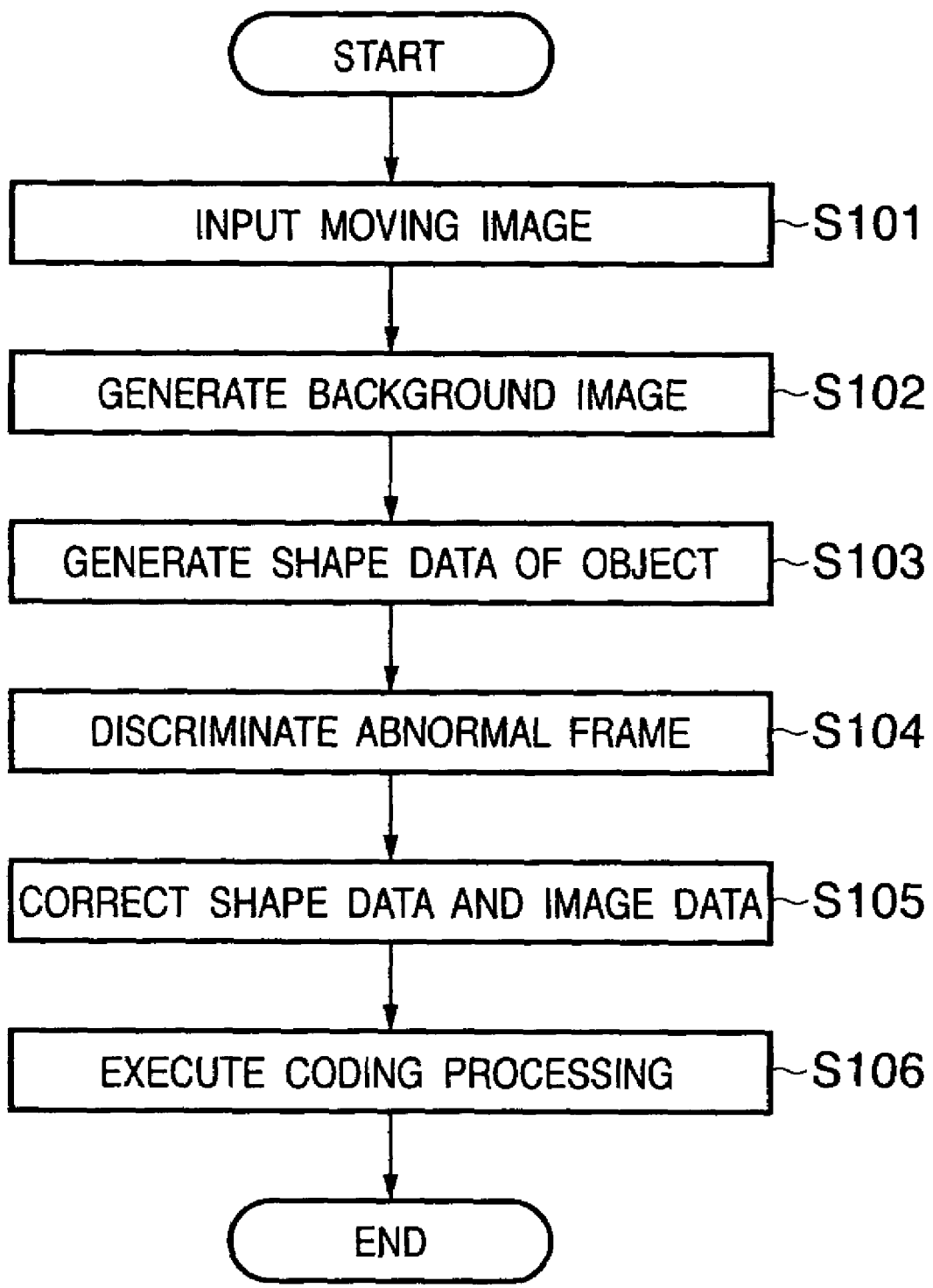
FIG. 2 is a flowchart for describing the operation of the image processing apparatus according to this embodiment.

FIG. 2 is a flowchart for describing the operation of the image processing apparatus according to this embodiment.

As shown in FIG. 2, a moving image is input from the image input unit 101 (step S101) and a background image (reference image) is generated by the background image generating unit 102 (step S102). The background subtraction processor 103 generates shape data representing the shape of an object from the input image that enters from the image input unit 101 and the reference image that enters from the background image generating unit 102 (step S103). The abnormal-data discrimination unit 105 discriminates an abnormal frame (step S104) and the shape-data correction unit 106 and image-data correction unit 107 correct the shape data of the object and the image data of the object, respectively (step S105). The encoder 104 codes the image data and shape data after the correction thereof (step S106).

More specifically, the image processing apparatus according to this embodiment acquires a moving image, which is composed of a plurality of frames, from the image input unit 101, acquires a background image relating to the moving image using the background image generating unit 102, extracts an object by comparing the background image with each of the frames constituting the moving image using the background subtraction processor 103, and determines whether the shape data of the extracted object is abnormal using the abnormal-data discrimination unit 105. If the shape data is determined to be abnormal, the shape data is corrected by the shape-data correction unit 106, the frame is corrected by the image-data correction unit 107 using the shape data corrected by the shape-data correction unit 106, and the corrected shape data and image data is coded by the encoder 104.

Discrimination of an abnormal frame at step S104 and processing for correcting the shape data and image data at step S105 will be described in detail in application to two embodiments set forth below. It should be noted that processing other than that set forth below is as described above.

First Embodiment

An image processing apparatus according to a first embodiment of the present invention will be described with reference to FIGS. 3 to 8. This is processing for dealing with the problem (firing of a flash in the middle of a scene) described above with reference to FIG. 15.

Figure 3:
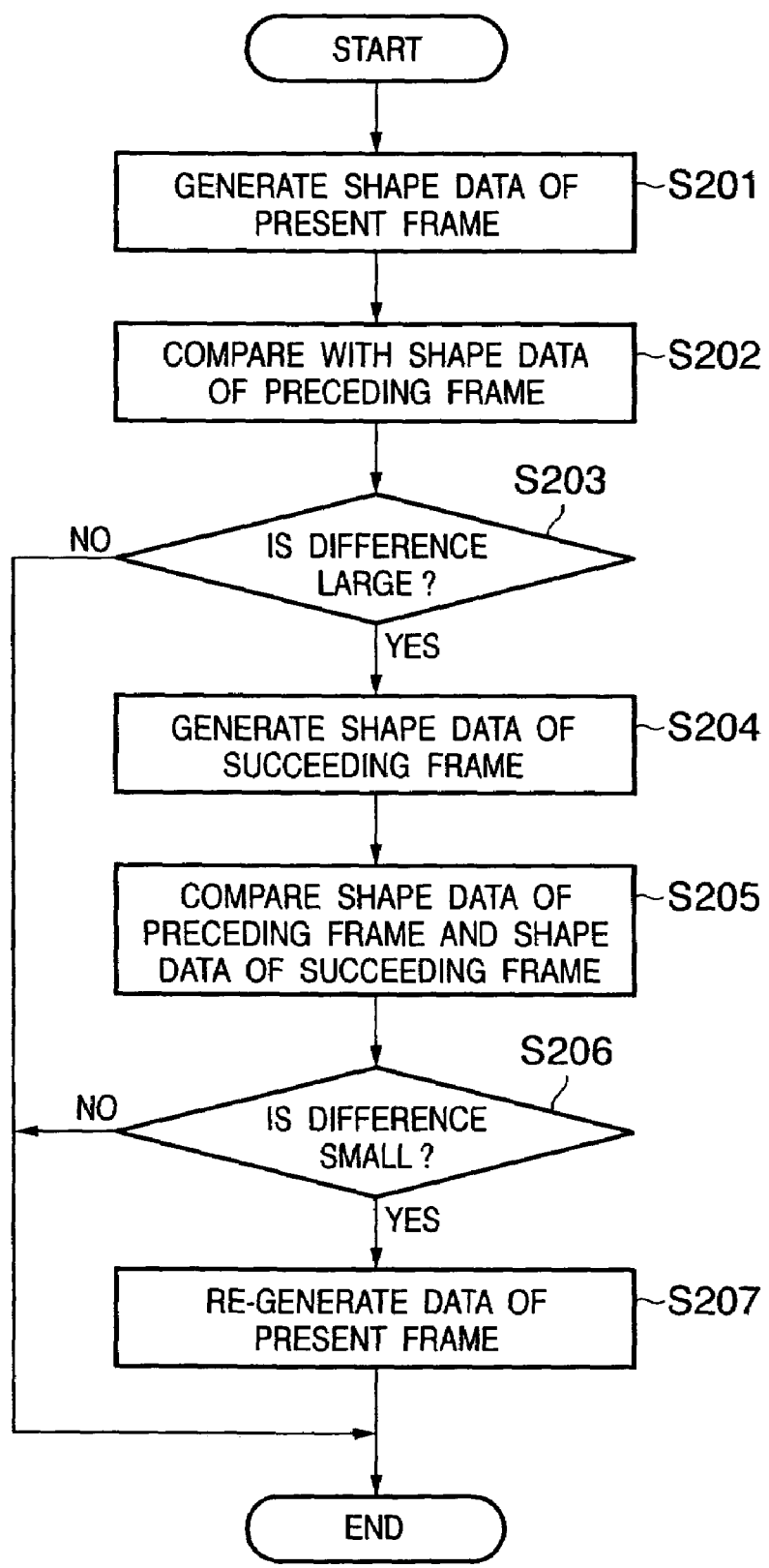
FIG. 3 is a flowchart useful in describing processing for detecting an abnormal frame, in which a flash has been fired, in an abnormal-data discrimination unit according to a first embodiment of the present invention.

FIG. 3 is a flowchart for describing processing for detecting an abnormal frame, in which a flash has been fired, by the abnormal-data discrimination unit 105 according to the first embodiment.

First, the abnormal-data discrimination unit 105 generates shape data of the present frame (step S201). This is data that is the result of extraction using a background subtraction method similar to that of the prior art. Next, the shape data of the preceding frame is compared with the shape data of the present frame (step S202).

Several methods are conceivable as methods of comparing the shape data. A comparison of areas is one of the simplest examples of comparison. By way of example, the number of pixels in shape data regarded as an object makes up the area of the object. Further, it is possible to adopt perimeter as a parameter, and expression by a curve using a Fourier descriptor also is possible. For a detailed explanation, see "Image Processing Engineering; Introductory Edition" edited by Yoshiharu Taniguchi. Furthermore, in this embodiment, any parameter may be selected for the comparison of shape data and there is no limitation whatsoever upon the comparison method. In other words, this embodiment is characterized in that the method of comparing shape data may be a comparison of any of the area, perimeter, wavelet identifier, circularity, centroid or moment of the shape data, or a combination thereof.

Processing branches depending upon the result of comparison (step S203). If the result of the comparison is that the difference is small ("NO" at step S203), it is determined that there is no abnormality. If the result of the comparison is that the difference is large ("YES" at step S203), then the shape data is examined. For example, if we let reference numerals 1401 and 1402 represent shape data of the preceding frame and shape data of the present frame, respectively, then the difference between the frames will be large and, hence, the shape data 1402 is examined to determine whether this frame is an abnormal frame.

As for the examination procedure, first the shape data of the succeeding frame is generated (step S204). Next, the shape data of the preceding frame is compared with the shape data of the succeeding frame (step S205). The method of comparison in this case may be the same as that carried out at step S202. Processing branches depending upon the result of this comparison (step S206).

Figure 15:
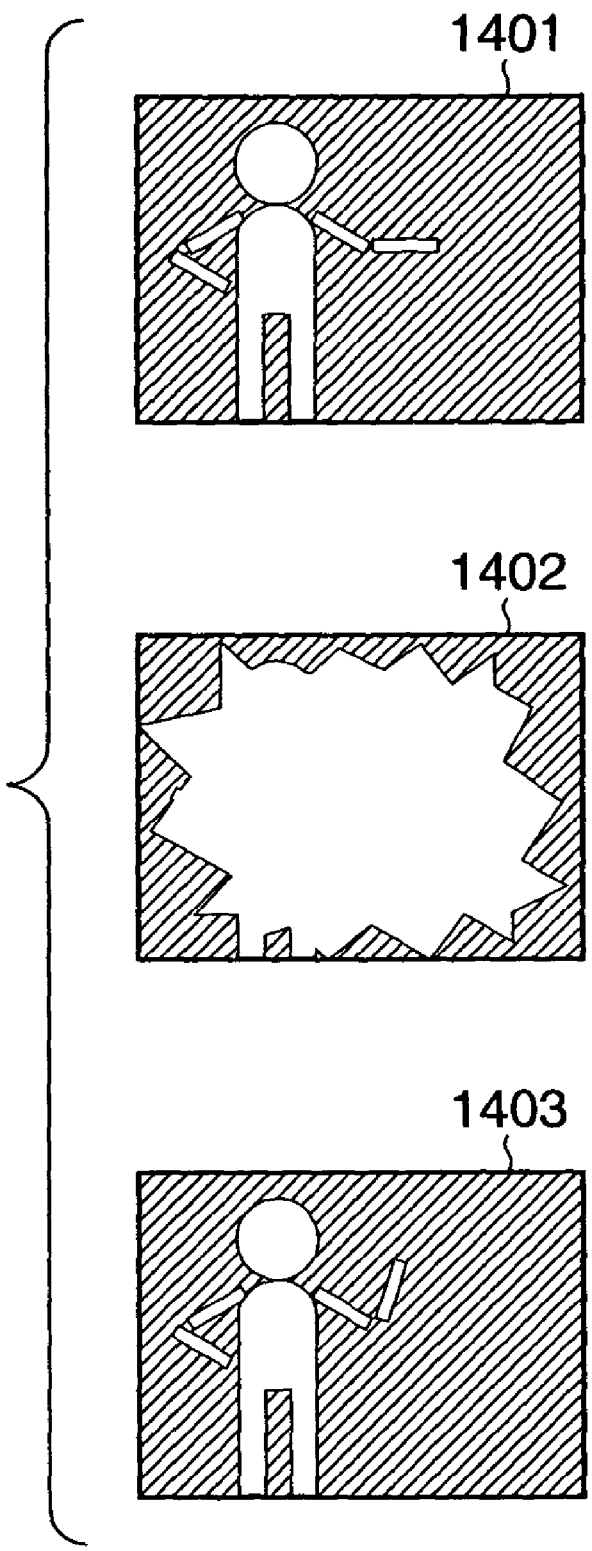
FIG. 15 is a diagram useful in describing shape data representing the shape of an object in a case where a flash is fired in the middle of a scene according to an example of the prior art.

If the decision rendered at step S206 is that the difference is small ("YES" at step S206), then it is judged that the shape data of the present frame is abnormal. If the difference is large ("NO" at step S206), on the other hand, this means that the change is not a momentary change and therefore it is judged that a flash is not the cause of the change. In FIG. 15, since the difference between the data 1401 of the preceding frame and data 1403 of the succeeding frame is small, it is judged that frame 1402 is one in which the flash was fired (i.e., that this is an abnormal frame). If an abnormality is determined, the data of the present frame (the shape data and image data of the present frame) is corrected (generated again) (step S207).

More specifically, the image processing apparatus according to this embodiment is characterized in that the abnormal-data discrimination unit 105 discriminates the necessity of the shape data correction by comparing the shape data of an object from frame to frame of a plurality of frames that differ in time.

Further, the image processing apparatus according to this embodiment is characterized in that the abnormal-data discrimination unit 105 compares the shape data of the object using the present frame and the preceding frame (step S202), compares the shape data of the object using the preceding frame and the succeeding frame (step S205), and decides that correction of the present frame is necessary if the difference in the shape data of the object between the present frame and the preceding frame is large and, moreover, the difference in the shape data of the object between the preceding frame and the succeeding frame is small.

The correction processing executed at step S207 will be described in greater detail later.

Figure 4:
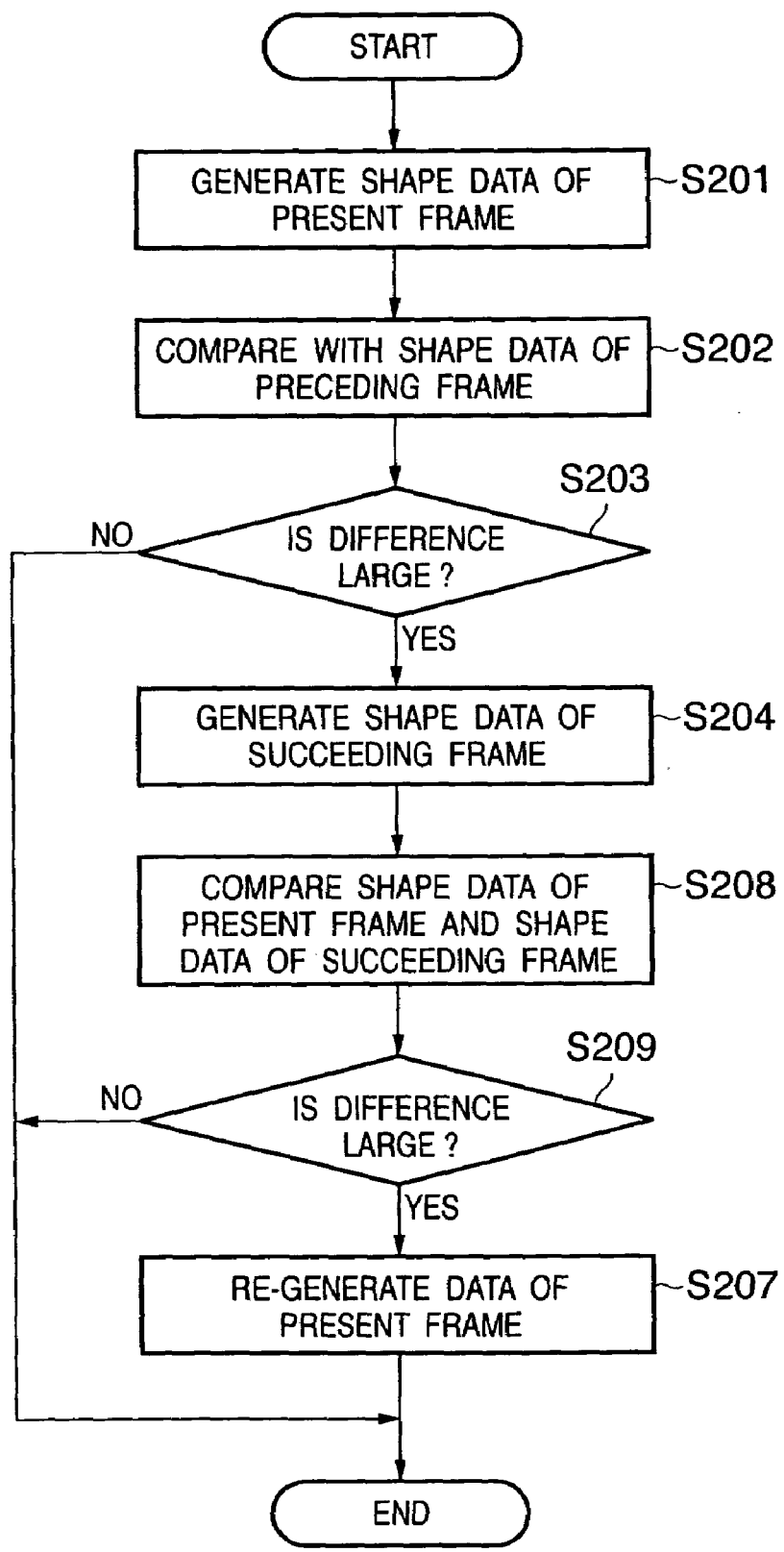
FIG. 4 is a flowchart useful in describing another example of discrimination processing for detecting a frame, in which a flash has been fired, in the abnormal-data discrimination unit according to the first embodiment.

FIG. 4 is a flowchart useful in describing another example of discrimination processing for detecting a frame, in which a flash has been fired, in the abnormal-data discrimination unit 105 according to the first embodiment. In the flowchart of FIG. 4, processing steps other than steps S208, S209 are processing steps identical with those shown in FIG. 3.

The shape data of the present frame is compared with the shape data of the succeeding frame at step S205. Further, if the decision rendered at step S209 is that the difference is large, this means that a flash has been fired; if the difference is small, this means that the flash has not been fired. If the difference is small, it can be considered that the state of the object has undergone a transition and that the object has attained a new state. For example, in FIG. 15, the difference between the shape data 1402 of the present frame and the shape data 1403 of the succeeding frame is large, it is judged that frame 1402 is one in which the flash was fired.

Further, in a special case in which a sudden change in shape data cannot be conceived as being ascribable to a cause other than a flash, it is possible to proceed to step S207 based solely on the result of the decision at step S203 without using the data of the succeeding frame.

In other words, the image processing apparatus according to this embodiment is characterized in that the abnormal-data discrimination unit 105 compares the shape data of the object using a present frame and a preceding frame (step S202), compares the shape data of the object using the present frame and the succeeding frame (step S208), and decides that correction of the present frame is necessary if the difference in the shape data of the object between the present frame and the preceding frame is large and, moreover, the difference in the shape data of the object between the present frame and the succeeding frame is small.

The processing (step S207) of a frame judged to require correction will now be described.

Figure 5:
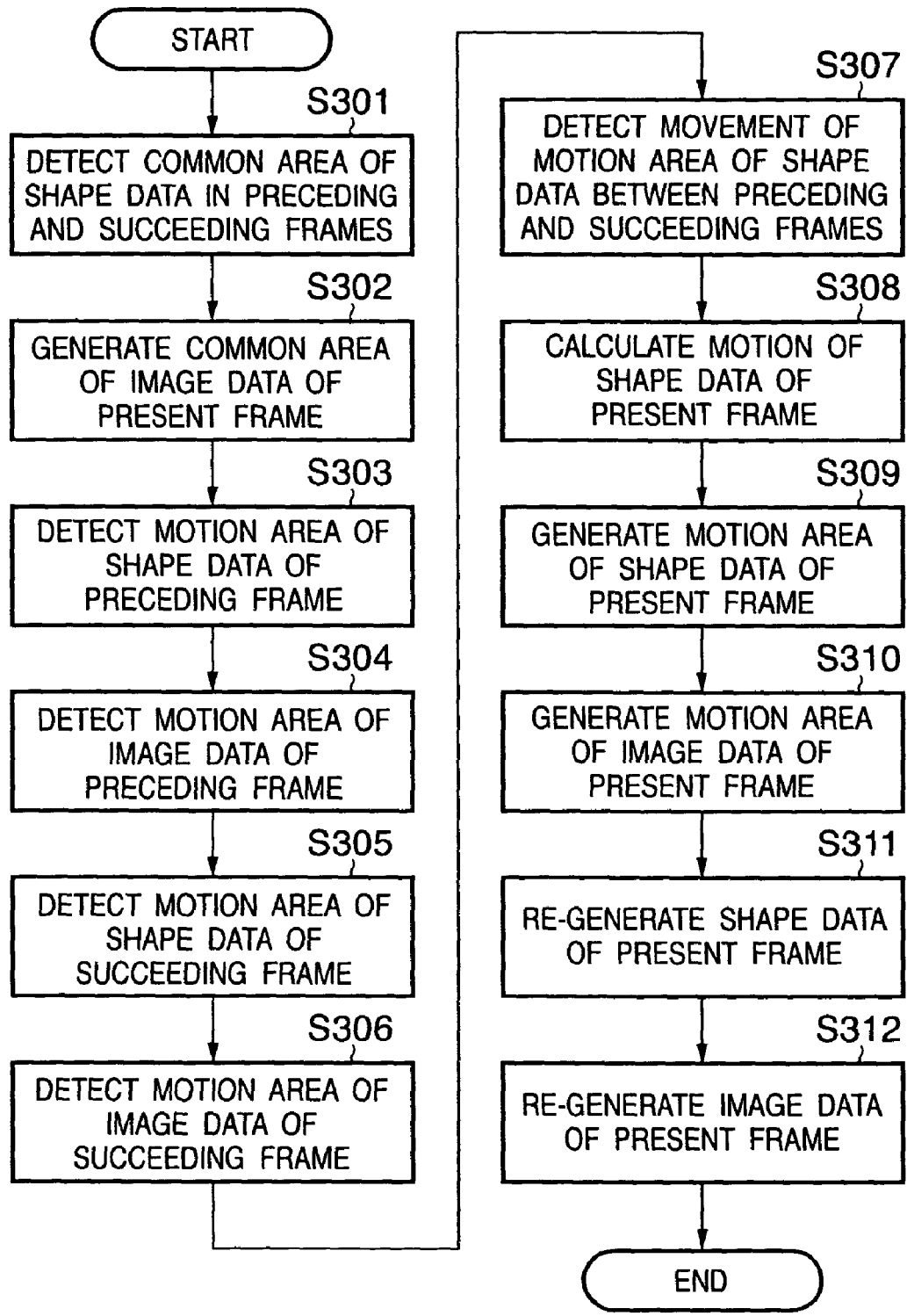
FIG. 5 is a flowchart useful in describing processing for correcting shape data and image data in the first embodiment.

FIG. 5 is a flowchart useful in describing processing for correcting shape data and image data in the first embodiment of the invention. If an object to be extracted is a rigid body, the entire body will move as one. If this is not the case, however, portions that exhibit different motion will appear locally. In the description that follows, an area in which all movements coincide shall be referred to as a "common area", and areas other than these in which local motion occurs shall be referred to as "motion areas".

Figure 7:
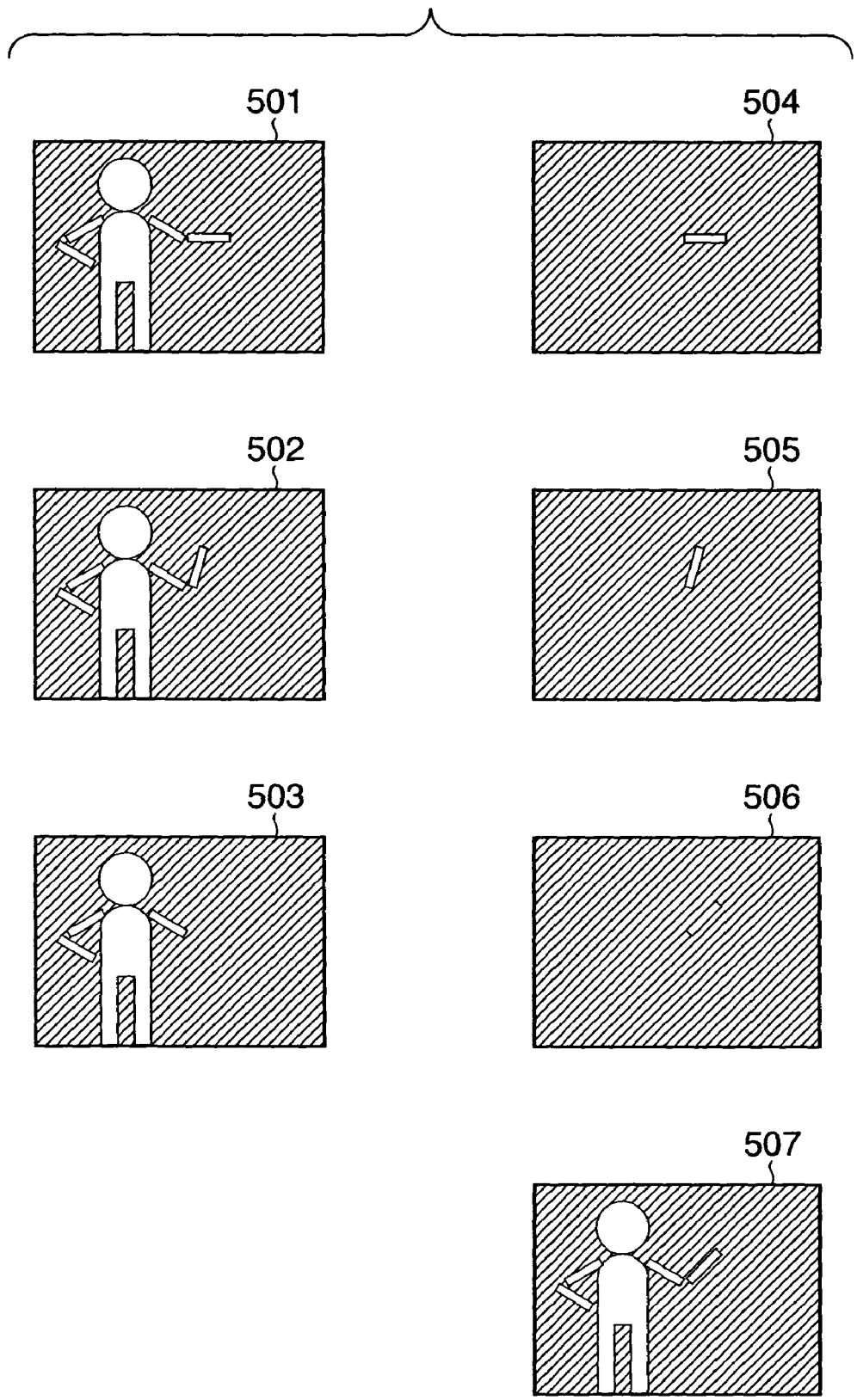
FIG. 7 is a diagram useful in describing shape data in the first embodiment.

First, the shape-data correction unit 106 detects a common area from shape data of the preceding and succeeding frames (step S301). This can be found in simple fashion by performing an AND operation between the shape data of the preceding frame and the shape data of the succeeding frame. In FIG. 7, reference numerals 501 denote shape data of a preceding frame, 502 shape data of a succeeding frame, and 503 a common area detected from these two frames.

Further, the image-data correction unit 107 generates a common area of image data in the present frame (step S302). This is generated by finding the average value between the image data of the preceding frame and the image data of the succeeding frame. That is, let Pp(x,y) and Pb(x,y) represent a pixel value of a certain point (x,y) in the preceding frame and a pixel value of the point in the succeeding frame, respectively. The average value can then be found by the calculation [Pp(x,y)+Pb(x,y)]/2.

Meanwhile, the shape-data correction unit 106 detects a motion area of the shape data in the preceding frame (step S303). This can be found by performing an exclusive-OR operation between the shape data 501 of the preceding frame and the common areas 503 of the preceding and succeeding frames. In FIG. 7, reference numeral 504 denotes the detected motion area of the preceding frame.

The image-data correction unit 107 detects a motion area of the image data in the preceding frame (step S304). This may be achieved merely by correlating the image data with the position of the shape data of the extracted motion area. The shape-data correction unit 106 similarly obtains a motion area of the shape data in the succeeding frame (step S305). In this case also the motion area can be found y performing an exclusive-OR operation between the shape data 502 of the succeeding frame and the common areas 503 of the preceding and succeeding frames. In FIG. 7, reference numeral 505 denotes the result of detection. The image-data correction unit 107 then detects a motion area of the image data in the succeeding frame (step S306). This also may be achieved merely by correlating the image data with the position of the shape data of the extracted motion area.

Next, the shape-data correction unit 106 detects movement of the motion area of shape data between the preceding and succeeding frames (step S307). Pattern matching using an affine transformation or the like can be employed in detecting corresponding points. An example of an affine transformation is as follows:

$$X=(x-x0)\cos\theta-(y-y0)\sin\theta+x0$$

$$Y=(x-x0)\sin\theta+(y-y0)\cos\theta+y0 \quad (2)$$

where (x0,y0) represents the center of rotation and θ the angle of rotation. Pattern matching adopts the sum total of the differences between the values obtained by this calculation and the actual values or the sum of the squares of these differences as an evaluation value and obtains the center position of rotation and the angle of rotation that will minimize this value.

Figure 8:
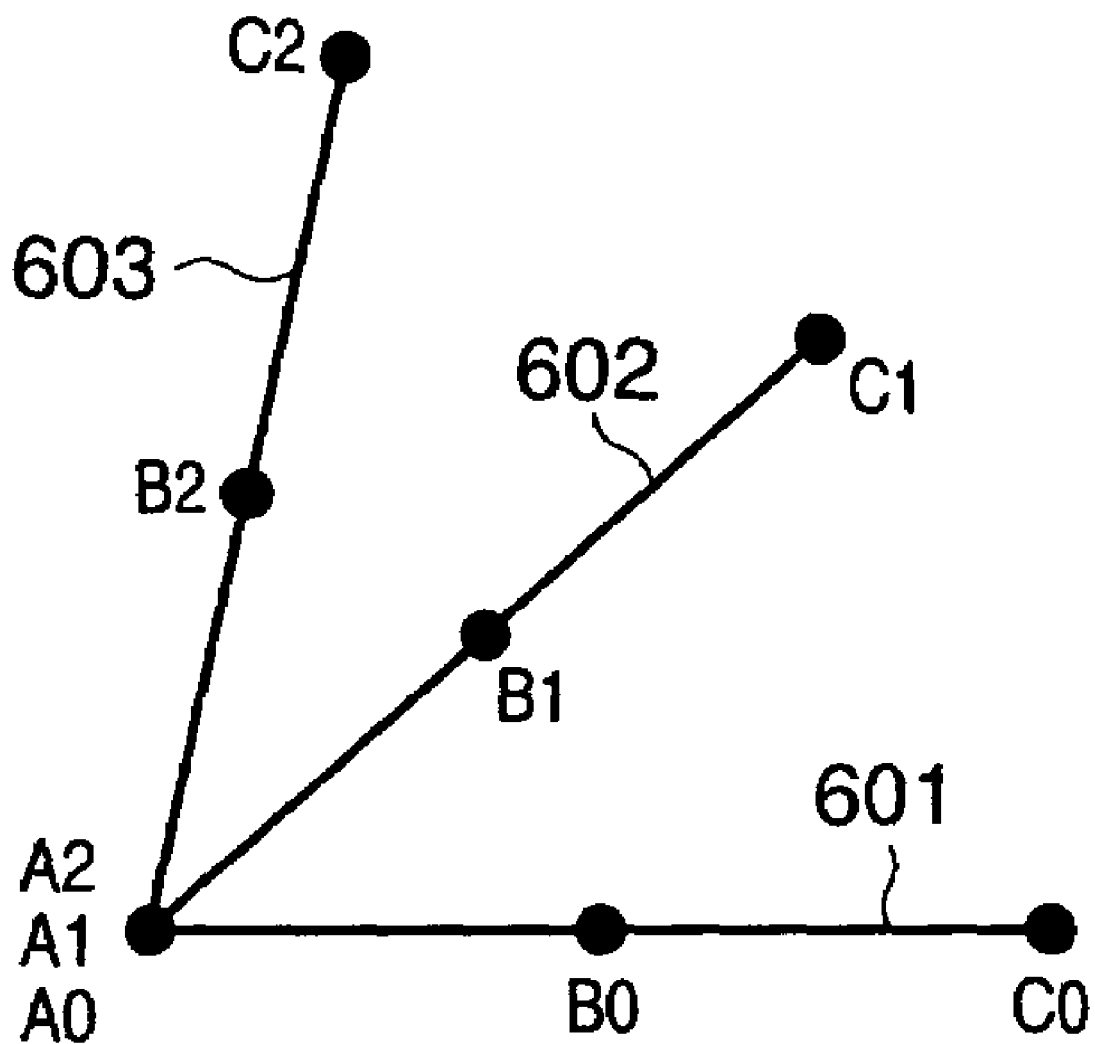
FIG. 8 is a diagram useful in describing result of detecting corresponding points in shape data in the first embodiment.

FIG. 8 is a diagram useful in describing result of detecting corresponding points in shape data according to the first embodiment. In order to simplify the description, the shape will be described as a line segment. In FIG. 8, let line segments 601 and 603 represent data in the preceding and succeeding frames, respectively. In this case, the angle defined by the line segments 601 and 603 is the angle of rotation in the affine transformation, and the position of the point at which A0 and A2 overlap is the center of rotation. Furthermore, points corresponding to B0 and C0 are B2 and C2, respectively.

Next, the shape-data correction unit 106 calculates motion of the shape data of the present frame (step S308). In a case where motion is obtained at the rotation angle and center of rotation in the manner shown in FIG. 8, the amount of motion can be found by making the rotation angle and center of rotation θ/2 and A0, respectively.

Furthermore, the shape-data correction unit 106 generates a motion area of shape data in the present frame (step S309). That is, the corresponding points are found by substituting the parameter calculated at step S308. As a result, a point corresponding to A0 and A2 becomes A1, a point corresponding to B0 and B2 becomes B1, and a point corresponding to C0 and C2 becomes C1. A line segment 602 obtained by connecting all of the corresponding points constitutes shape data of the present frame. Reference numeral 506 in FIG. 7 denotes shape data of the motion area of the present frame obtained in this fashion.

More specifically, this embodiment is characterized in that the shape-data correction unit 106 corrects the shape data of the object in an Nth frame, which has been determined to be abnormal, using an (N−1)th or earlier frame determined to be normal and an (N+1)th or later frame determined to be normal.

Further, this embodiment is characterized in that the shape-data correction unit 106 detects corresponding points in the shape data between an (N−1)th or earlier frame and an (N+1)th or later frame. Furthermore, this embodiment is characterized in that the shape-data correction unit 106 obtains amount of motion of corresponding points by performing pattern matching with respect to one or each of a plurality of prescribed areas. Furthermore, this embodiment is characterized in that the amount of motion of the corresponding points is amount of movement and amount of rotation of the positions of the corresponding points obtained by an affine transformation.

Next, the image-data correction unit 107 generates image data corresponding to the shape data generated at step S309 (step S310). That is, utilizing the parameter obtained at step S308, the image-data correction unit 107 obtains pixel values from the average values of corresponding points, as by obtaining the pixel value of A1 from the average value of A0 and A2 and the pixel value of B1 from the average value of B0 and B2. It should be noted that this method of obtaining average values is similar to that of the procedure described at step S302.

The shape-data correction unit 106 then combines the shape data of the common area obtained at step S301 and the shape data of the motion area obtained at step S309 and re-generates the shape data of the present frame (step S311). Reference numeral 507 in FIG. 7 denotes shape data of the present frame thus obtained. Furthermore, the image-data correction unit 107 combines the image data of the common area obtained at step S302 and the image data of the motion area obtained at step S310 and re-generates the image data of the present frame (step S312).

When the shape data and image data of the present frame is re-generated through the procedure described above, processing is completed. This data is then input to the encoder 104 and subjected to MPEG-4 coding in the manner described above.

Thus, in accordance with the image processing apparatus according to the first embodiment, as set forth above, a frame in which shape data is discontinuous, as in the case of an image illuminated by a flash, is detected, and this frame is corrected based upon the frames before and after it. As a result, the occurrence of excessive amount of code can be suppressed with regard to both the shape data and image data and it is possible to realize a coding system that provides excellent visual results.

Second Embodiment

A second embodiment of the present invention will be described with reference to FIGS. 9 to 12. This embodiment relates to processing for dealing with the problem (instances where one object that is not to be extracted crosses in front of another object that is to be extracted) described above with reference to FIG. 16.

Figure 9:
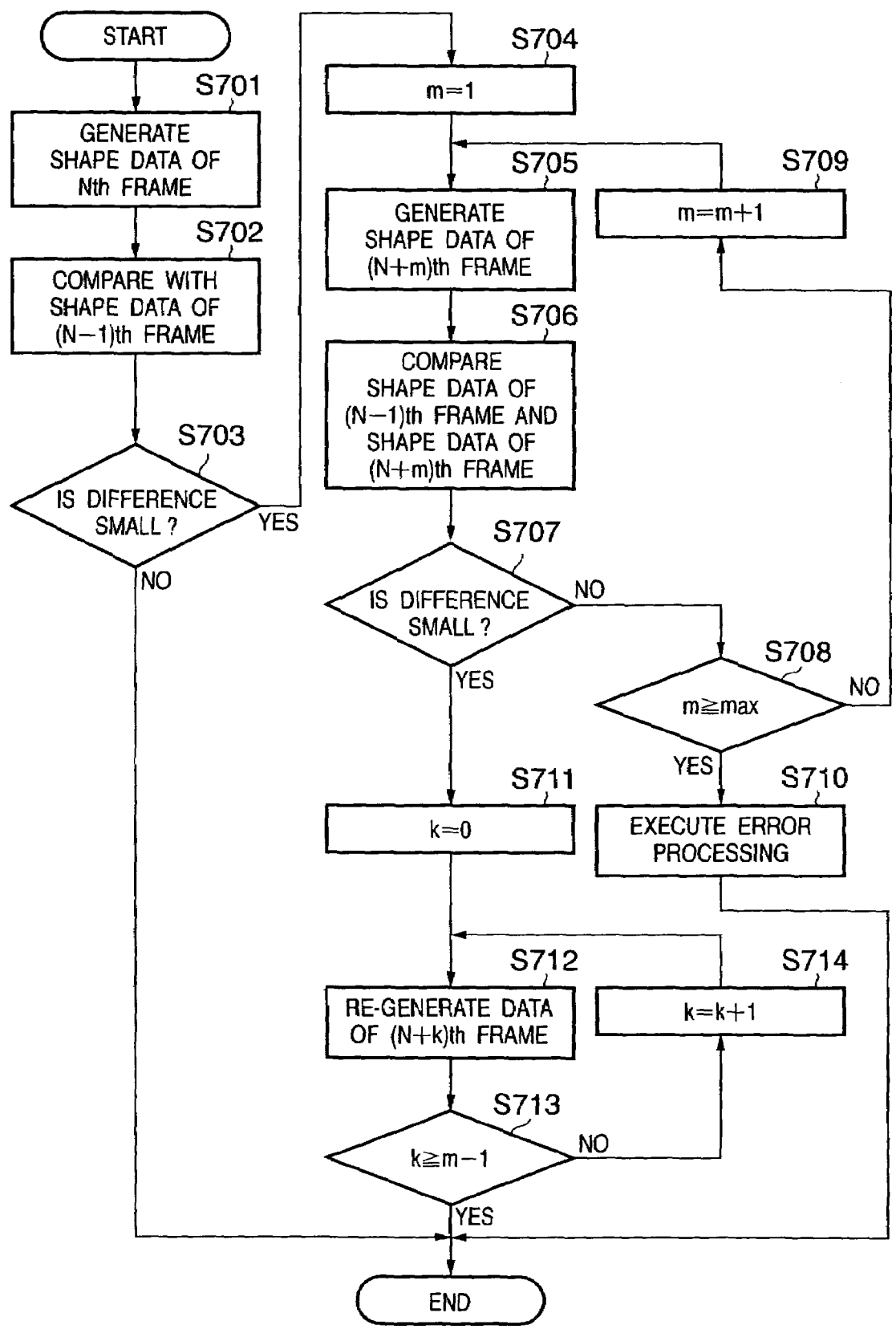
FIG. 9 is a flowchart for describing operation of the abnormal-data discrimination unit according to a second embodiment of the present invention.

FIG. 9 is a flowchart for describing operation of the abnormal-data discrimination unit 105 according to a second embodiment of the present invention. The processing of steps S701 to S703 is the same as that of steps S201 to S203 in FIG. 3 described in connection with the first embodiment. Here, however, the present frame is described as the Nth frame. Further, reference numerals 1501 to 1504 in FIG. 16 shall denote shape data of (N−1)th, Nth, (N+1)th and (N+2)th frames, respectively. In this example, the shape data 1502 of the present frame is compared with the shape data of the preceding frame and the difference is large ("YES" at step S703). The shape data, therefore, is examined.

If an object that is not to be extracted crosses in front of an object that is to be extracted, it is expected that a large change in shape will be detected over a plurality of frames. The reason for this is that such a change does not appear in only one frame. Accordingly, a counter m is reset to 1 (step S704) as initialization processing for counting up the number of frames.

Next, the abnormal-data discrimination unit 105 generates shape data of the (N+1)th frame (the frame that follows the present frame) (step S705). The abnormal-data discrimination unit 105 then compares the generated shape data of the (N+1)th frame and the shape data of the (N−1)th frame (step S706). The method of comparison is the same as that of step S703. The abnormal-data discrimination unit 105 then determines whether the difference between the items of data is small or not (step S707). If the decision rendered is that the difference is small ("YES" at step S707), then it is judged that the shape data of the present frame is abnormal. If the difference is large ("NO" at step S707), on the other hand, then it is judged that the next frame also is to be examined. In the example shown in FIG. 16, the shape data 1501 is compared with the shape data 1503 and the difference is judged to be large.

The abnormal-data discrimination unit 105 determines whether the counter value m has attained a maximum value max (step S708). To decide the maximum value max, maximum time believed to be necessary for an object to cross in front of another object that is not to be extracted is set beforehand. For example, if the frame rate is 15 fps and a maximum of two seconds is considered, then max is set to 30. If the counter value m has not reached the maximum value m ("NO" at step S708), then the counter value m is incremented (step S709).

If it is found at step S708 that the counter value m has reached the maximum value max ("YES" at step S708), then error processing is executed (step S710). In this case, it is considered not that something has crossed in front of the object to be extracted but that the shape of this object itself has changed in a major way. Further, in a case where shape data that is not corrected is used as is without any problems, no particular error processing is executed and the processing of this frame may be terminated.

Figure 16:
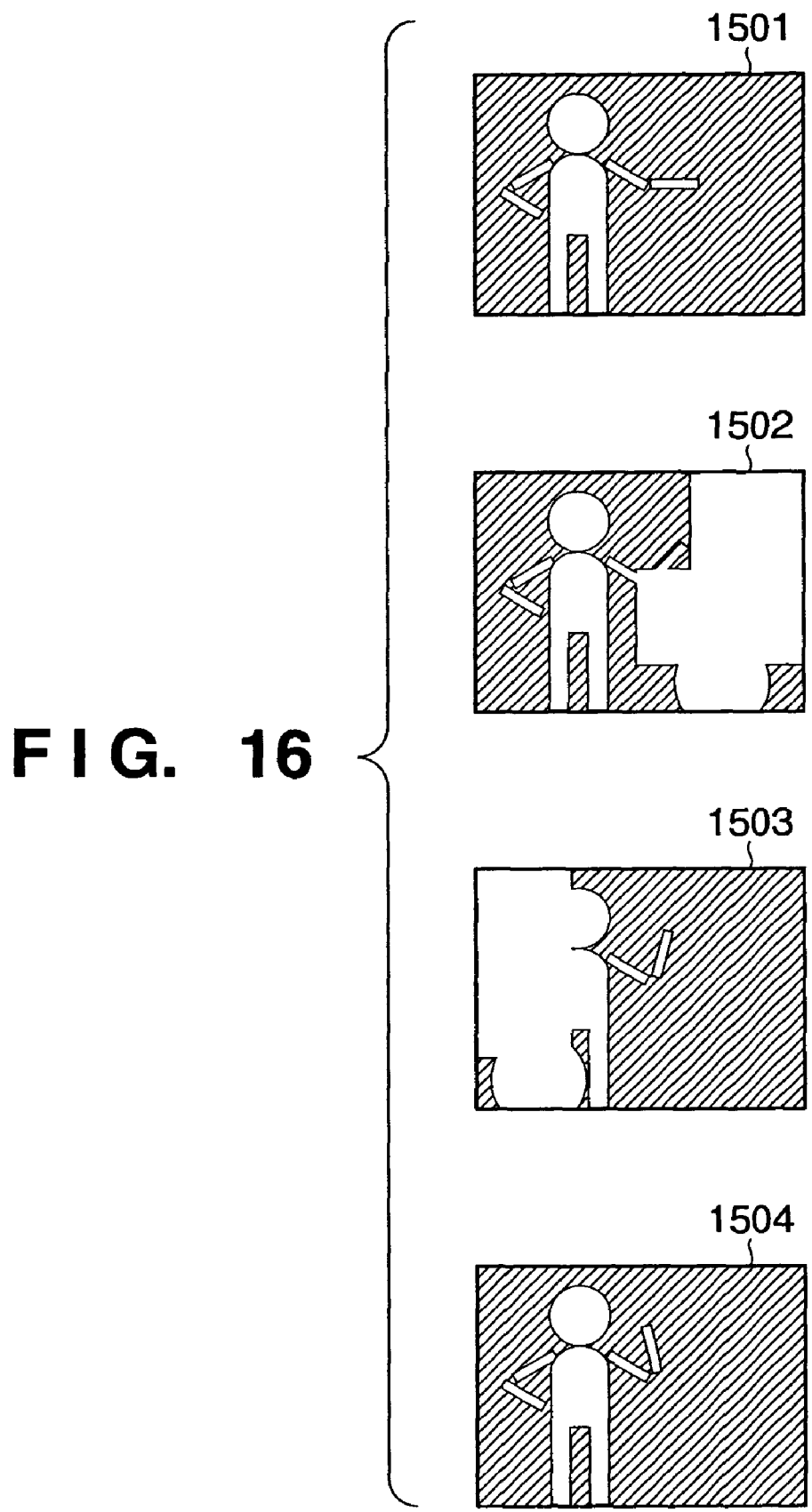
FIG. 16 is a diagram useful in describing shape data representing the shape of an object in a case where one object crosses in front of another object in an example of the prior art.

The abnormal-data discrimination unit 105 repeats the processing of steps S705 to S709 above and exits this loop if it determines at step S707 that the difference is small ("YES" at step S707). The counter value m prevailing at this time will be the number of frames in which the result of extraction has been deemed to be abnormal. This is the number of frames that require re-generation of data. In the example of FIG. 16, the shape data of frame 1501 is compared with the shape data of frame 1504 and the loop is exited at the moment m becomes 2.

At steps S711 to S714, processing for correcting (re-generating) data in the detected m-number of frames is executed. First, initialization processing for setting a frame-number counter k to zero is executed (step S711). Step S712 is the main part of correction processing and the details thereof will be described later. Until end is discriminated (step S713) and k becomes equal to m−1, the value of k is incremented at step S714 and the above processing is repeated. When data re-generation from the Nth frame to the (N+m−1)th frame ends, one series of processing steps ends. In the example of FIG. 16, m is equal to 2 and the data of frames 1502 and 1503 is re-generated.

In the flowchart of FIG. 9, an example in which the Nth frame is processed is described. However, in a case where data correction has been carried out, the frame processed next may be made the (N+m+1)th frame rather than the (N+1)th frame.

In other words, the image processing apparatus according to this embodiment is characterized in that the abnormal-data discrimination unit 105 compares the shape data of the object using a present frame and a preceding frame (step S702), compares the shape data of the object using frames following the present frame and the preceding frame (step S706), and decides that correction of a prescribed frame from the present frame or later is necessary if the difference between the present frame and the preceding frame is large and, moreover, a difference in the shape data of the object between the preceding frame and the frames following the present frame is small.

Processing for correcting a frame judged to require correction will now be described.

Figure 10:
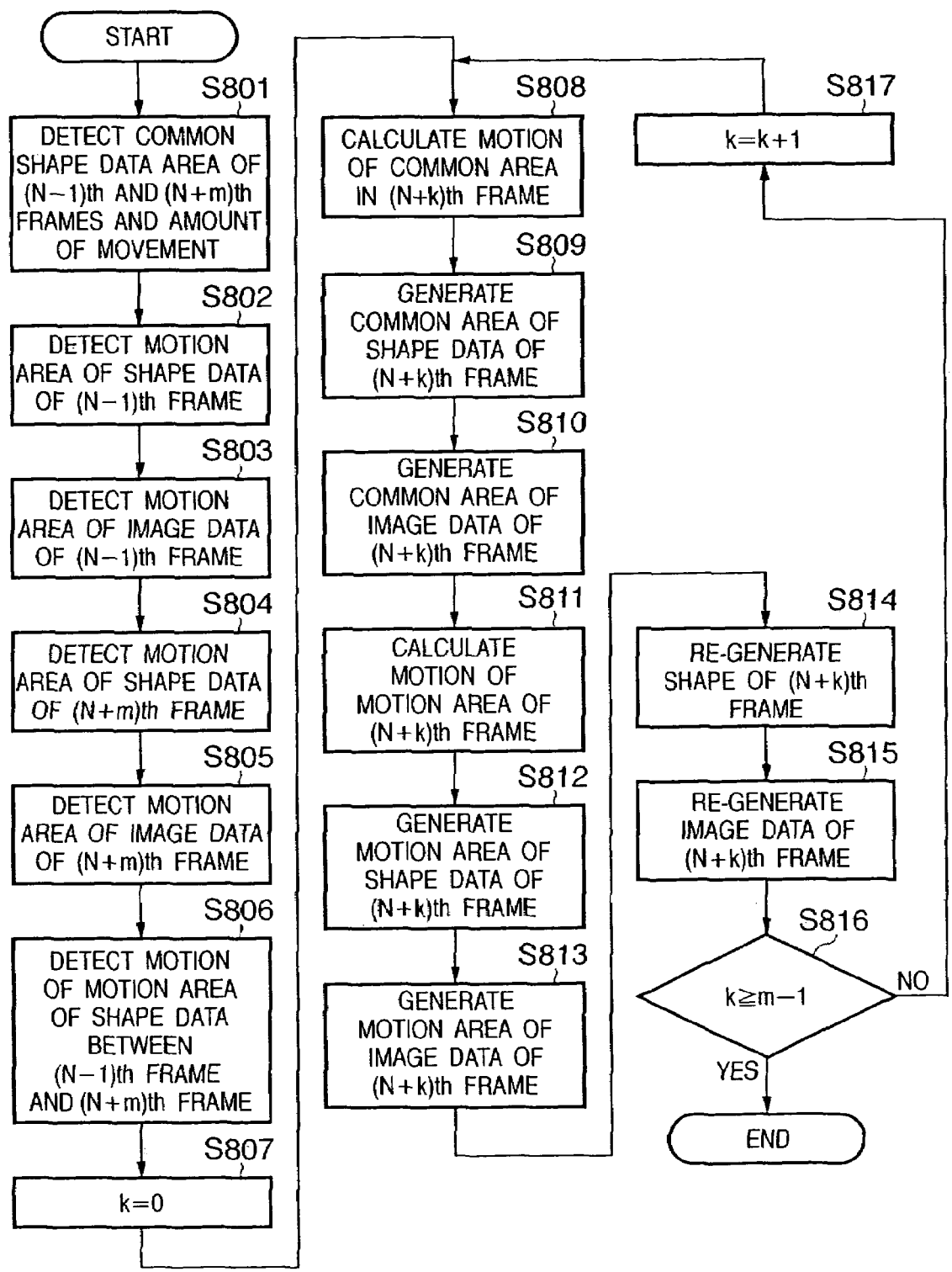
FIG. 10 is another flowchart useful in describing processing for correcting shape data and image data in the second embodiment.

FIG. 10 is another flowchart useful in describing processing for correcting shape data and image data according to the second embodiment.

First, the shape-data correction unit 106 detects a common area from shape data of the (N−1)th and (N+m)th frames (step S801). This can be found in simple fashion by performing an AND operation between the shape data of the (N−1)th frame and the shape data of the (N+m)th frame in a manner similar to that described above with reference to FIG. 5. Unlike the case of FIG. 5, however, it is considered that the common area has moved if the time interval between frames is long. In this case, it is so arranged that motion of the overall object to be extracted is found by pattern matching. If the affine transformation described in FIG. 5 is used, the amount of translational motion and amount of rotation of the object between frames can be obtained.

Specifically, if we let θ represent the angle of rotation from the (N−1)th frame to the (N+m)th frame and let (X0,y0) represent the amount of movement between these frames, then the angle of rotation in the (N+k)th frame will be θ×(k+1)/(m+1) and the amount of movement will be [x0×(k+1)/(m+1), y0×(k+1)/(m+1)]. After the positions are made to coincide by these parameters, the common area can be detected by performing the AND operation.

Figure 11:
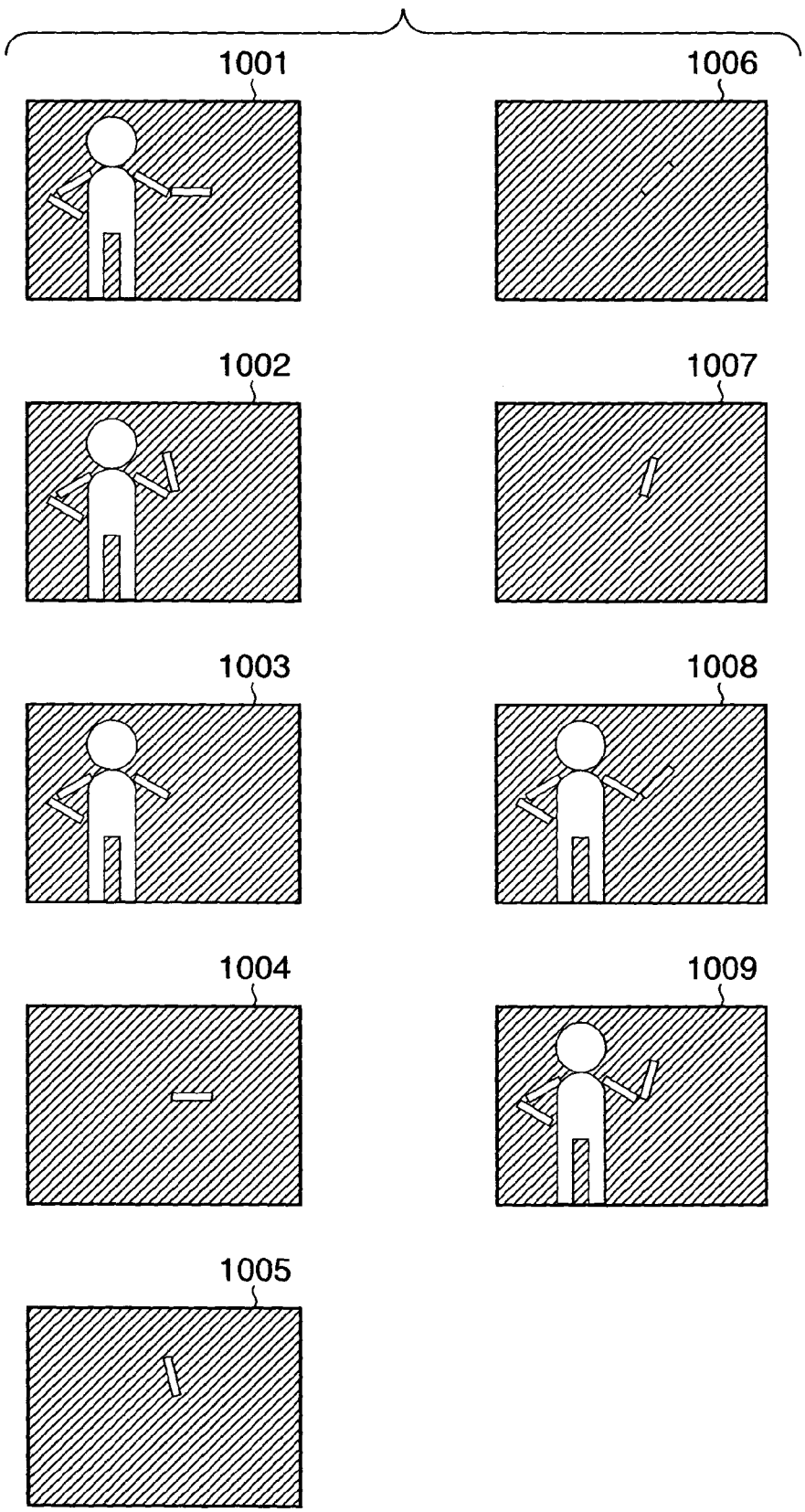
FIG. 11 is a diagram useful in describing shape data in the second embodiment.

FIG. 11 is a diagram useful in describing shape data according to the second embodiment. In the example of FIG. 11, reference numerals 1001 and 1002 denote shape data in (N−1)th and (N+2)th frames, respectively. Since there is no movement of the common area, the angle of rotation is zero and the amount of movement is (0,0). Reference numeral 103 denotes a common area obtained from the shape data 1001 and 1002.

If there is local motion outside of the common area, then detection of the motion area is performed. First, the motion area of the shape data in the (N−1)th frame is detected (step S802). This can be found by performing an exclusive-OR operation after the positions of the shape data 1001 of the (N−1)th frame and common area 1003 are made to coincide. Reference numeral 1004 denotes the extracted motion area of the (N−1)th frame. Next, the motion area of the image data in the (N−1)th frame is detected (step S803). This is image data that corresponds to the area found at step S802.

Similarly, the motion area of the shape data in the (N+m)th frame is detected (step S804). This can be found by performing an exclusive-OR operation after the positions of the shape data 1002 of the (N+m)th frame and common area 1003 are made to coincide. Reference numeral 1005 denotes the detected motion area of the (N−1)th frame. Next, the motion area of the image data in the (N+m)th frame is detected (step S805). This is image data that corresponds to the area found at step S804.

Next, movement of the motion area of the shape data between the (N−1)th frame and the (N+m)th frame is detected (step S806). This involves detecting corresponding points between the shape data 1004 of the (N−1)th frame and the shape data 1005 of the (N+m)th frame. Detection of the corresponding points employs pattern matching using an affine transformation or the like.

Figure 12:
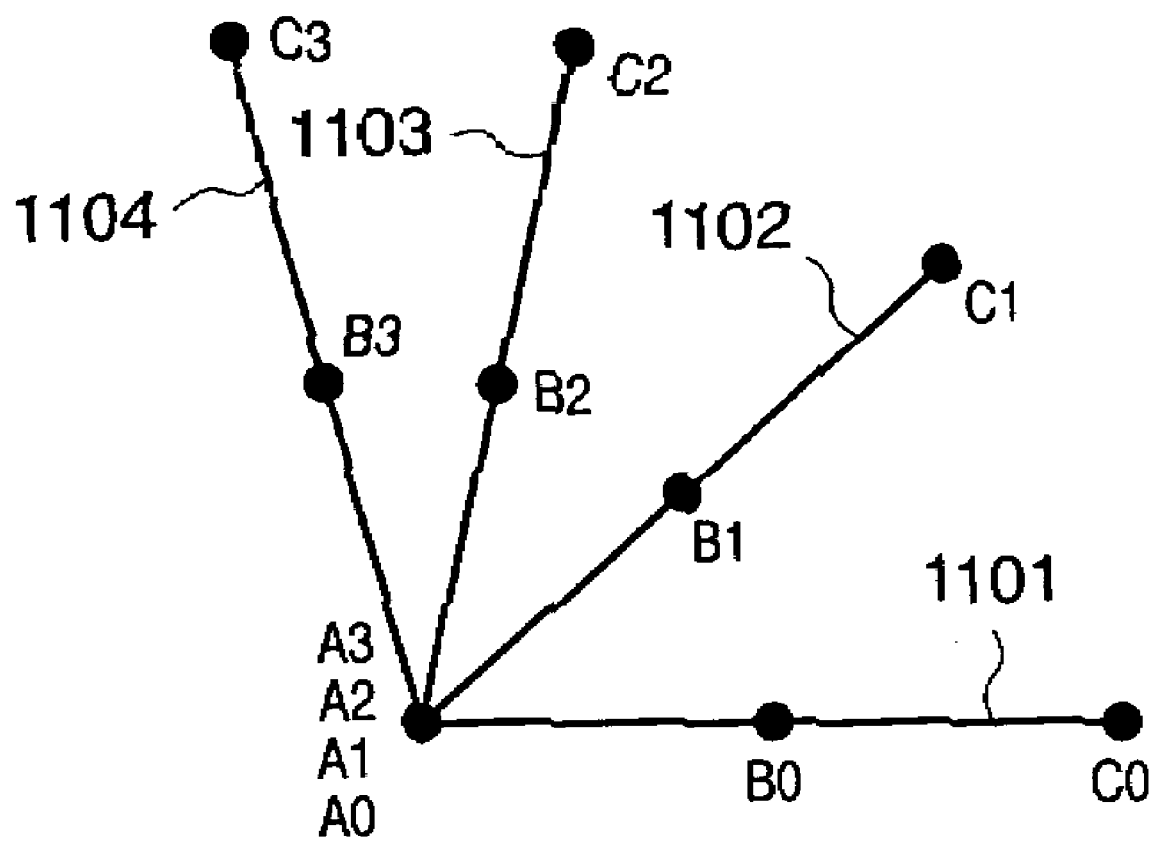
FIG. 12 is a diagram useful in describing processing for detecting corresponding points in shape data in the second embodiment.

FIG. 12 is a diagram useful in describing processing for detecting corresponding points in shape data in the second embodiment. In order to simplify the description, the shape will be described as a line segment. In FIG. 12, let reference numeral 1101 denote the (N−1)th frame and let a line segment 1104 represent data in the (N+m)th frame. The angle defined by the line segments 1101 and 1104 is an angle of rotation θ' in this affine transformation, and the position of the point at which A0 and A3 overlap is the center (x'0,y'0) of rotation. The points corresponding to B0 and C0 are B3 and C3, respectively.

The processing of each frame to be corrected is executed in the steps that follow. First, initialization processing is executed (step S807). Here the counter k for counting the number of frames to be corrected is set to zero. Next, motion of the common area in the (N+k)th frame is calculated (step S808). This is calculated from the amount of movement obtained at step S801. In the example of FIG. 11, the angle of rotation is zero and the amount of movement is (0,0). The shape data of the common area is generated from the values obtained at step S808 (step S809). In the example of FIG. 11, the amount of movement of the common area is zero and therefore the common area of the shape data in the Nth frame coincides with the common area 1003.

Next, image data corresponding to the shape data obtained at step S809 is generated (step S810). Let P0(x,y) and Pm(x,y) represent a pixel value of a certain point (x,y) in the (N−1)th frame and a pixel value of the point in the (N+m)th frame, respectively. The pixel value in the (N+k)th frame can then be found by the calculation [P0(x,y)×(m−k)+Pm(x,y)×(k+1)]/(m+1). In a case where it is considered that there is almost no change in the common area, a simple method that may be adopted is to use the average value [P0(x,y)+Pm(x,y)]/2. An even simpler approach that is conceivable is to utilize P0(x,y) as is. This is equivalent to copying the image data of the (N−1)th frame as is.

Next, movement of the motion area of the (N+k)th frame is calculated (step S811). This is found from the detection of the previously obtained movement between the motion area in the (N−1)th frame and the motion area in the (N+m)th frame. Since the angle of rotation from the (N−1)th frame to the (N+m)th frame is θ' and the amount of movement is (x'0,y'0), the angle of rotation in the (N+k)th frame is θ'×(k+1)(m+1) and the amount of movement is [x'0×(k+1)/(m+1), y'0×(k+1)/(m+1)]. When m=2 holds, the angle of rotation in the Nth frame is θ'/3 and the amount of movement is (x'0/3, y'0/3).

Shape data of the motion area is generated from the values obtained at step S811 (step S812). In FIG. 12, line segment 1102 is obtained if points corresponding to the rotation angle θ'/3 and amount of movement (x'0/3, y'0/3) are found with respect to line segment 1101. Next, image data corresponding to the shape data of the motion area is generated (step S813). The method is the same as that used to calculate the pixel values in the common area. If we let P'0(x',y') and P'm(x',y') represent a pixel value of a certain point (x',y') in the (N−1)th frame and a pixel value of the point in the (N+m)th frame, respectively, then the pixel value in the (N+k)th frame will be found by the calculation [P'0(x',y')×(m−k)+P'm(x',y')×(k+1)]/(m+1).

The shape data of the (N+k)th frame is re-generated (step S814). This is achieved by combining the shape data of the common area found at step S809 and the shape data of the motion area found at step S812. Reference numeral 1008 in FIG. 1 represents shape data that has been re-generated in the Nth frame. Next, the image data of the (N+k)th frame is re-generated (step S815). This is achieved by combining the image data of the common area found at step S810 and the image data of the motion area found at step S813.

The number of frames is discriminated (step S816). If the number of frames is less than m−1 ("NO" at step S816), then the value of k is incremented at step S817 and the processing of steps S808 onward is repeated. If m is equal to 2, then the data of the Nth and (N+1)th frames is re-generated and this series of processing steps is terminated. In the (N+1)th frame, the angle of rotation is θ'×2/3 and the amount of movement is (x'0×2/3, y'0×2/3). If the corresponding points are found, line segment 1103 in FIG. 12 is obtained. Further, reference numeral 1007 in FIG. 11 denotes the motion area of the shape data in the (N+1)th frame, and reference numeral 1009 denotes the shape area that has been regenerated in the (N+1)th frame.

Here only one type of local motion outside of the motion area has been described. However, if a plurality of motions exist, it will suffice to repeat processing for motion-area detection a number of times equal to the number of motions.

Thus, in accordance with the second embodiment as described above, a plurality of frames in which shape data is discontinuous, as in the case of an image obtained when an object that is not to be extracted crosses in front of an object that is to be extracted, are detected, and these frames are corrected based upon the frames before and after them. As a result, the occurrence of excessive amount of code can be suppressed with regard to both the shape data and image data and it is possible to realize a coding system that provides excellent visual results.

Third Embodiment

Figure 6:
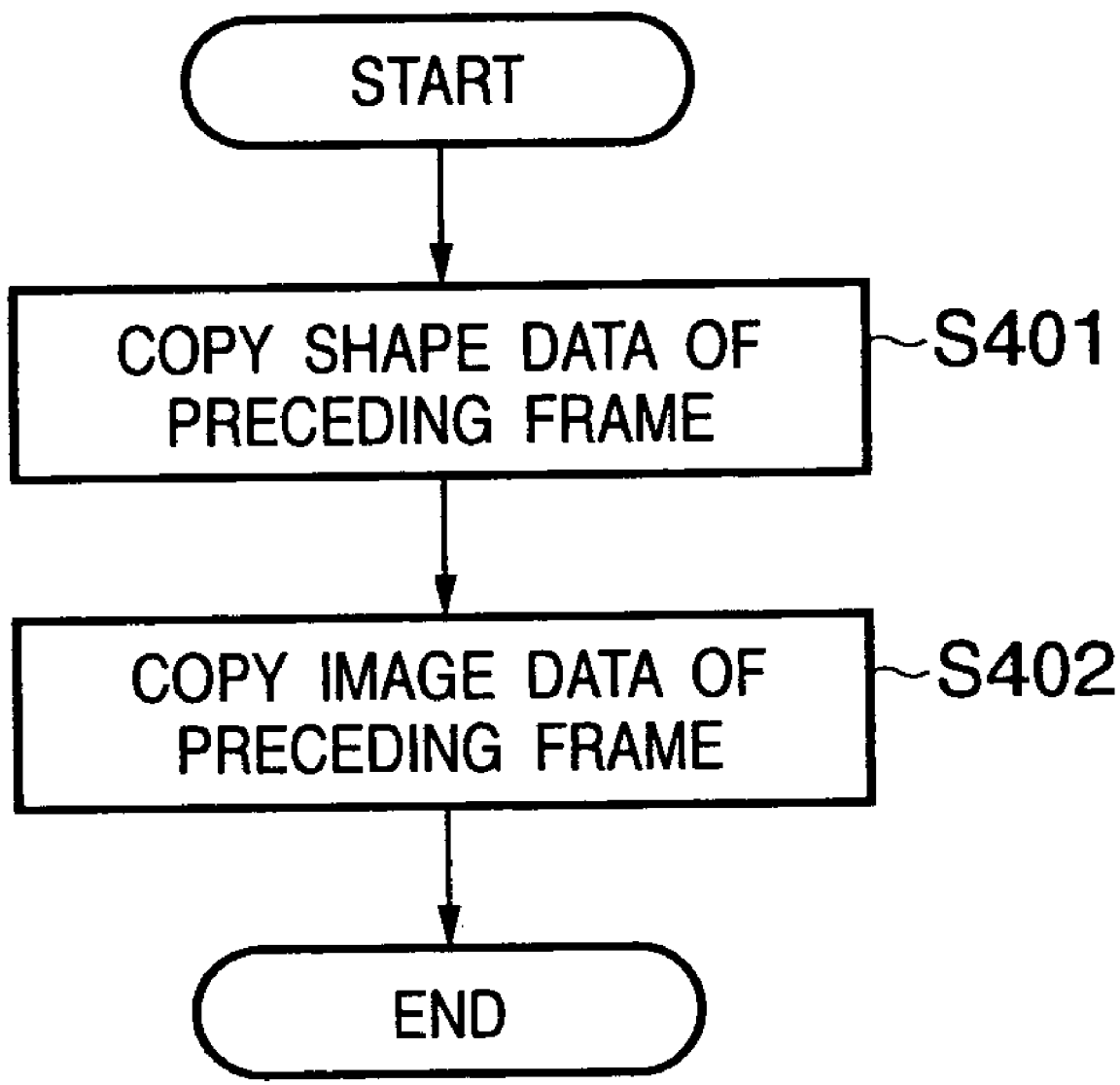
FIG. 6 is another flowchart relating to correction of shape data and image data in a third embodiment of the present invention.

FIG. 6 is another flowchart relating to correction of shape data and image data in a third embodiment of the present invention. Specifically, according to this embodiment, processing for correcting the shape data and image data by the shape-data correction unit 106 and image-data correction unit 107 in the first and second embodiments set forth above is made processing for replacing this data with shape data and image data of a frame determined to be normal (i.e., by copying the shape data and image data of the normal frame).

More specifically, this embodiment is characterized in that the shape-data correction unit 106 replaces shape data in an Nth frame determined to be abnormal with shape data in an (N−1)th or earlier frame determined to be normal (step S401). Further, this embodiment is characterized in that the image-data correction unit 107 generates an Nth frame determined to be abnormal from an (N−1)th frame determined to be normal and an (N+1)th frame determined to be normal. Furthermore, the embodiment is characterized in that the image-data correction unit 107 replaces an Nth frame determined to be abnormal with an (N−1)th frame determined to be normal (step S402).

Other Embodiments

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention is attained also by supplying a recording medium (or storage medium) on which the program codes of the software for performing the functions of the foregoing embodiments to a system or an apparatus have been recorded, reading the program codes with a computer (e.g., a CPU or MPU) of the system or apparatus from the recording medium, and then executing the program codes. In this case, the program codes read from the recording medium themselves implement the novel functions of the embodiments, and the program codes per se and recording medium storing the program codes constitute the invention. Further, besides the case where the aforesaid functions according to the embodiments are implemented by executing the program codes read by a computer, it goes without saying that the present invention covers a case where an operating system or the like running on the computer performs a part of or the entire process based upon the designation of program codes and implements the functions according to the embodiments.

It goes without saying that the present invention further covers a case where, after the program codes read from the recording medium are written in a function expansion card inserted into the computer or in a memory provided in a function expansion unit connected to the computer, a CPU or the like contained in the function expansion card or function expansion unit performs a part of or the entire process based upon the designation of program codes and implements the function of the above embodiment.

In a case where the present invention is applied to the above-mentioned recording medium, program code corresponding to the flowcharts described earlier is stored on the recording medium.

Thus, in accordance with the present invention, as described above, even if shape data representing the shape of an object in a moving image undergoes a major change temporarily, a frame that is to be corrected can be detected and corrected in ideal fashion and it is possible to execute moving-image coding that is outstanding both visually and in terms of coding efficiency.

The present invention is not limited to the above embodiments and various changes and modifications can be made within the spirit and scope of the present invention. Therefore, to apprise the public of the scope of the present invention, the following claims are made.

What is claimed is:

1. An image processing apparatus, comprising:
   moving-image input means for inputting a moving image composed of a plurality of frames;
   background-image acquisition means for acquiring a background image relating to the moving image that has been input;
   object extraction means for extracting an object by comparing each of the frames constituting the moving image with the background image;
   abnormal-data discrimination means for discriminating whether shape data representing the shape of the extracted object is abnormal or not;
   shape-data correction means for correcting the shape data based upon a result of discrimination of the shape data;
   image-data correction means for generating image data, which represents the image of the object, conforming to the shape data that has been corrected by said shape-data correction means; and
   coding means for coding the shape data and the image data,
   wherein said abnormal-data discrimination means discriminates the necessity of correcting the shape data by comparing the shape data of the object from frame to frame of a plurality of frames that differ in time, and
   wherein said abnormal-data discrimination means comprises:
      first comparison means for comparing the shape data of the object using a present frame and a preceding frame;
      second comparison means for comparing the shape data of the object using the preceding frame and a succeeding frame; and
      decision means for deciding that correction of the present frame is necessary if a difference in the shape data of the object between the present frame and the preceding frame is large and a difference in the shape data of the object between the preceding frame and the succeeding frame is small.

2. The apparatus according to claim 1, wherein said first or second comparison means performs the comparison using a comparison of any of the area, perimeter, wavelet identifier, circularity, centroid or moment of the shape data, or a combination thereof.

3. An image processing apparatus, comprising:
   moving-image input means for inputting a moving image composed of a plurality of frames;
   background-image acquisition means for acquiring a background image relating to the moving image that has been input;

object extraction means for extracting an object by comparing each of the frames constituting the moving image with the background image;

abnormal-data discrimination means for discriminating whether shape data representing the shape of the extracted object is abnormal or not;

shape-data correction means for correcting the shape data based upon a result of discrimination of the shape data;

image-data correction means for generating image data, which represents the image of the object, conforming to the shape data that has been corrected by said shape-data correction means; and coding means for coding the shape data and the image data, wherein said abnormal-data discrimination means discriminates the necessity of correcting the shape data by comparing the shape data of the object from frame to frame of a plurality of frames that differ in time, and wherein said abnormal-data discrimination means comprises:

first comparison means for comparing the shape data of the object using a present frame and a preceding frame;

second comparison means for comparing the shape data of the object using the present frame and a succeeding frame; and decision means for deciding that correction of the present frame is necessary if a difference in the shape data of the object between the present frame and the preceding frame is large and a difference in the shape data of the object between the present frame and the succeeding frame is large.

4. An image processing apparatus, comprising:

moving-image input means for inputting a moving image composed of a plurality of frames;

background-image acquisition means for acquiring a background image relating to the moving image that has been input;

object extraction means for extracting an object by comparing each of the frames constituting the moving image with the background image;

abnormal-data discrimination means for discriminating whether shape data representing the shape of the extracted object is abnormal or not;

shape-data correction means for correcting the shape data based upon a result of discrimination of the shape data;

image-data correction means for generating image data, which represents the image of the object, conforming to the shape data that has been corrected by said shape-data correction means; and coding means for coding the shape data and the image data, wherein said abnormal-data discrimination means discriminates the necessity of correcting the shape data by comparing the shape data of the object from frame to frame of a plurality of frames that differ in time, and wherein said abnormal-data discrimination means comprises:

first comparison means for comparing the shape data of the object using a present frame and a preceding frame;

second comparison means for comparing the shape data of the object using frames following the present frame and the preceding frame; and decision means for deciding that correction of prescribed frames from the present frame onward is necessary if a difference between the present frame and the preceding frame is large and a difference in the shape data of the object between the preceding frame and the frames following the present frame is small.

5. An image processing apparatus, comprising:

moving-image input means for inputting a moving image composed of a plurality of frames;

background-image acquisition means for acquiring a background image relating to the moving image that has been input;

object extraction means for extracting an object by comparing each of the frames constituting the moving image with the background image;

abnormal-data discrimination means for discriminating whether shape data representing the shape of the extracted object is abnormal or not;

shape-data correction means for correcting the shape data based upon a result of discrimination of the shape data;

image-data correction means for generating image data, which represents the image of the object, conforming to the shape data that has been corrected by said shape-data correction means; and coding means for coding the shape data and the image data, wherein said shape-data correction means corrects the shape data of the object in an Nth frame, which has been determined to be abnormal, using an (N−1)th or earlier frame determined to be normal and an (N+1)th or later frame determined to be normal, and wherein said shape-data correction means comprises detection means for detecting corresponding points in the shape data between an (N−1)th or earlier frame and an (N+1)th or later frame.

6. The apparatus according to claim 5, wherein said detection means obtains amount of motion of the corresponding points by performing pattern matching with respect to one or each of a plurality of prescribed areas.

7. The apparatus according to claim 6, wherein the amount of motion of the corresponding points is an amount of movement and an amount of rotation of the position of the corresponding points obtained by an affine transformation.

8. An image processing method, comprising:

a moving-image acquisition step of acquiring a moving image composed of a plurality of frames;

a background-image acquisition step of acquiring a background image relating to the moving image;

an object extraction step of extracting an object by comparing each of the frames constituting the moving image with the background image;

an abnormal-data discrimination step of discriminating whether shape data representing the shape of the extracted object is abnormal or not;

a shape-data correction step of correcting the shape data based upon a result of discrimination of the shape data;

an image-data correction step of generating image data, which represents the image of the object, conforming to the shape data that has been corrected in said shape-data correction step; and a coding step of coding the shape data and the image data, wherein said abnormal-data discrimination step includes discriminating the necessity of correcting the shape data by comparing the shape data of the object from frame to frame of a plurality of frames that differ in time, and wherein said abnormal-data discrimination step further includes:

a first comparison step of comparing the shape data of the object using a present frame and a preceding frame;

a second comparison step of comparing the shape data of the object using the preceding frame and a succeeding frame; and a decision step of deciding that correction of the present frame is necessary if a difference in the shape data of the object between the present frame and the preceding frame is large and a difference in the shape data of the object between the preceding frame and the succeeding frame is small.

9. The method according to claim 8, wherein said first or second comparison step performs the comparison using a comparison of any of the area, perimeter, wavelet identifier, circularity, centroid or moment of the shape data, or a combination thereof.

10. An image processing method, comprising:

a moving-image acquisition step of acquiring a moving image composed of a plurality of frames;

a background-image acquisition step of acquiring a background image relating to the moving image;

an object extraction step of extracting an object by comparing each of the frames constituting the moving image with the background image;

an abnormal-data discrimination step of discriminating whether shape data representing the shape of the extracted object is abnormal or not;

a shape-data correction step of correcting the shape data based upon a result of discrimination of the shape data;

an image-data correction step of generating image data, which represents the image of the object, conforming to the shape data that has been corrected in said shape-data correction step; and a coding step of coding the shape data and the image data, wherein said abnormal-data discrimination step includes discriminating the necessity of correcting the shape data by comparing the shape data of the object from frame to frame of a plurality of frames that differ in time, and wherein said abnormal-data discrimination step further includes:
a first comparison step of comparing the shape data of the object using a present frame and a preceding frame;

a second comparison step of comparing the shape data of the object using the present frame and a succeeding frame; and a decision step of deciding that correction of the present frame is necessary if a difference in the shape data of the object between the present frame and the preceding frame is large and a difference in the shape data of the object between the present frame and the succeeding frame is large.

11. An image processing method, comprising:

a moving-image acquisition step of acquiring a moving image composed of a plurality of frames;

a background-image acquisition step of acquiring a background image relating to the moving image;

an object extraction step of extracting an object by comparing each of the frames constituting the moving image with the background image;

an abnormal-data discrimination step of discriminating whether shape data representing the shape of the extracted object is abnormal or not;

a shape-data correction step of correcting the shape data based upon a result of discrimination of the shape data;

an image-data correction step of generating image data, which represents the image of the object, conforming to the shape data that has been corrected in said shape-data correction step; and a coding step of coding the shape data and the image data, wherein said abnormal-data discrimination step includes discriminating the necessity of correcting the shape data by comparing the shape data of the object from frame to frame of a plurality of frames that differ in time, and wherein said abnormal-data discrimination step further includes:
a first comparison step of comparing the shape data of the object using a present frame and a preceding frame;

a second comparison step of comparing the shape data of the object using frames following the present frame and the preceding frame; and a decision step of deciding that correction of prescribed frames from the present frame onward is necessary in a case where a difference between the present frame and the preceding frame is large and a difference in the shape data of the object between the preceding frame and the frames following the present frame is small.

12. An image processing method, comprising:

a moving-image acquisition step of acquiring a moving image composed of a plurality of frames;

a background-image acquisition step of acquiring a background image relating to the moving image;

an object extraction step of extracting an object by comparing each of the frames constituting the moving image with the background image;

an abnormal-data discrimination step of discriminating whether shape data representing the shape of the extracted object is abnormal or not;

a shape-data correction step of correcting the shape data based upon result of discrimination of the shape data;

an image-data correction step of generating image data, which represents the image of the object, conforming to the shape data that has been corrected in said shape-data correction step; and a coding step of coding the shape data and the image data, wherein said shape-data correction step includes correcting the shape data of the object in an Nth frame, which has been determined to be abnormal, using an (N−1)th or earlier frame determined to be normal and an (N+1)th or later frame determined to be normal, and wherein said shape-data correction step further includes a detection step of detecting corresponding points in the shape data between an (N−1)th or earlier frame and an (N+1)th or later frame.

13. The method according to claim 12, wherein said detection step includes obtaining an amount of motion of the corresponding points by performing pattern matching with respect to one or each of a plurality of prescribed areas.

14. The method according to claim 13, wherein the amount of motion of the corresponding points is an amount of movement and an amount of rotation of the position of the corresponding points obtained by an affine transformation.

15. A computer-readable storage medium storing a program which, when executed, performs a method for processing an image, the program comprising:

code for a moving-image input step of inputting a moving image composed of a plurality of frames;

code for a background-image acquisition step of acquiring a background image relating to the moving image that has been input;

code for an object extraction step of extracting an object by comparing each of the frames constituting the moving image with the background image;

code for an abnormal-data discrimination step of discriminating whether shape data representing the shape of the extracted object is abnormal or not;

code for a shape-data correction step of correcting the shape data based upon a result of discrimination of the shape data;

code for an image-data correction step of generating image data, which represents the image of the object, conforming to the shape data that has been corrected in the shape-data correction step; and code for a coding step of coding the shape data and the image data, wherein said abnormal-data discrimination step includes discriminating the necessity of correcting the shape data by comparing the shape data of the object from frame to frame of a plurality of frames that differ in time, and wherein said abnormal-data discrimination step further includes:

a first comparison step of comparing the shape data of the object using a present frame and a preceding frame;

a second comparison step of comparing the shape data of the object using the preceding frame and a succeeding frame; and a decision step of deciding that correction of the present frame is necessary if a difference in the shape data of the object between the present frame and the preceding frame is large and a difference in the shape data of the object between the preceding frame and the succeeding frame is small.

16. A computer-readable storage medium storing a program which, when executed, performs a method for processing an image, the program comprising:

code for a moving-image input step of inputting a moving image composed of a plurality of frames;

code for a background-image acquisition step of acquiring a background image relating to the moving image that has been input;

code for an object extraction step of extracting an object by comparing each of the frames constituting the moving image with the background image;

code for an abnormal-data discrimination step of discriminating whether shape data representing the shape of the extracted object is abnormal or not;

code for a shape-data correction step of correcting the shape data based upon a result of discrimination of the shape data;

code for an image-data correction step of generating image data, which represents the image of the object, conforming to the shape data that has been corrected in the shape-data correction step; and code for a coding step of coding the shape data and the image data, wherein the abnormal-data discrimination step includes discriminating the necessity of correcting the shape data by comparing the shape data of the object from frame to frame of a plurality of frames that differ in time, and wherein the abnormal-data discrimination step further includes:

a first comparison step of comparing the shape data of the object using a present frame and a preceding frame;

a second comparison step of comparing the shape data of the object using the present frame and a succeeding frame; and a decision step of deciding that correction of the present frame is necessary if a difference in the shape data of the object between the present frame and the preceding frame is large and a difference in the shape data of the object between the present frame and the succeeding frame is large.

17. A computer-readable storage medium storing a program which, when executed, performs a method for processing an image, the program comprising:

code for a moving-image input step of inputting a moving image composed of a plurality of frames;

code for a background-image acquisition step of acquiring a background image relating to the moving image that has been input;

code for an object extraction step of extracting an object by comparing each of the frames constituting the moving image with the background image;

code for an abnormal-data discrimination step of discriminating whether shape data representing the shape of the extracted object is abnormal or not;

code for a shape-data correction step of correcting the shape data based upon a result of discrimination of the shape data;

code for an image-data correction step of generating image data, which represents the image of the object, conforming to the shape data that has been corrected in the shape-data correction step; and code for a coding step of coding the shape data and the image data, wherein the abnormal-data discrimination step includes discriminating the necessity of correcting the shape data by comparing the shape data of the object from frame to frame of a plurality of frames that differ in time, and wherein the abnormal-data discrimination step further includes:

a first comparison step of comparing the shape data of the object using a present frame and a preceding frame;

a second comparison step of comparing the shape data of the object using frames following the present frame and the preceding frame; and a decision step of deciding that correction of prescribed frames from the present frame onward is necessary if a difference between the present frame and the preceding frame is large and a difference in the shape data of the object between the preceding frame and the frames following the present frame is small.

18. A computer-readable storage medium storing a program which, when executed, performs a method for processing an image, the program comprising:

code for a moving-image input step of inputting a moving image composed of a plurality of frames;

code for a background-image acquisition step of acquiring a background image relating to the moving image that has been input;

code for an object extraction step of extracting an object by comparing each of the frames constituting the moving image with the background image;

code for an abnormal-data discrimination step of discriminating whether shape data representing the shape of the extracted object is abnormal or not;

code for a shape-data correction step of correcting the shape data based upon a result of discrimination of the shape data;

code for an image-data correction step of generating image data, which represents the image of the object, conforming to the shape data that has been corrected in the shape-data correction step; and code for a coding step of coding the shape data and the image data, wherein the shape-data correction step includes correcting the shape data of the object in an Nth frame, which has been determined to be abnormal, using an (N−1)th or earlier frame determined to be normal and an (N+1)th or later frame determined to be normal, and wherein the shape-data correction means further includes a detection step of detecting corresponding points in the shape data between an (N−1)th or earlier frame and an (N+1)th or later frame.

* * * * *

UNITED STATES PATENT AND TRADEMARK OFFICE
CERTIFICATE OF CORRECTION

PATENT NO. : 7,257,265 B2
APPLICATION NO. : 10/649642
DATED : August 14, 2007
INVENTOR(S) : Osamu Itokawa It is certified that error appears in the above-identified patent and that said Letters Patent is hereby corrected as shown below:

ON THE TITLE PAGE [57] ABSTRACT:

Line 8, "from a" should read --from an--.

COLUMN 3:

Line 25, "an-object" should read --an object--;
Line 29, "front" should read --front of--;
Line 35, "amount" should read --the amount--; and
Line 65, "result" should read --the result--.

COLUMN 4:

Line 63, "amount" should read --the amount--.

COLUMN 5:

Line 1, "is amount" should read --is the amount-- and
        "amount of" should read --the amount of--;
Line 60, "result" should read --the result--; and
Line 62, "operation" should read --the operation--.

COLUMN 7:

Line 53, "depending" should read --depends--.

COLUMN 8:

Line 2, "depending" should read --depends--; and
Line 40, "S208," should read --S208 and--.

Signed and Sealed this

Sixth Day of July, 2010

David J. Kappos
*Director of the United States Patent and Trademark Office*

COLUMN 9:

Line 44, "y" should read --by--; and
    Line 54, "shape" should read --the shape--.

COLUMN 10:

Line 4, "result" should read --the result--;
    Line 43, "amount" should read --the amount-- and
        "corresponding" should read --the corresponding--;
    Line 47, "is amount" should read --is the amount-- and
        "amount of" should read --the amount of--; and
    Line 64, "shape" should read --the shape--.

COLUMN 12:

Line 19, "require" should read --requires--; and
    Lines 28-29, "Until end is discriminated (step S713) and k becomes equal to
        m-1," should read --If the value of k is less than m-1 (step S713),--.

COLUMN 13:

Line 1, "and amount" should read --and the amount--.

COLUMN 14:

Line 29, "amount" should read --the amount--; and
    Line 51, "steps" should read --step--.

COLUMN 15:

Line 17. "processing for" should read --by--.